US011882578B2

(12) United States Patent
Huang et al.

(10) Patent No.: US 11,882,578 B2
(45) Date of Patent: Jan. 23, 2024

(54) UPLINK CONTROL INFORMATION MULTIPLEXING RULE SIMPLIFICATION FOR REDUCED CAPABILITY USER EQUIPMENTS

(71) Applicant: QUALCOMM Incorporated, San Diego, CA (US)

(72) Inventors: Yi Huang, San Diego, CA (US); Jing Lei, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/314,591

(22) Filed: May 7, 2021

(65) Prior Publication Data
US 2021/0360634 A1 Nov. 18, 2021

Related U.S. Application Data
(60) Provisional application No. 63/025,549, filed on May 15, 2020.

(51) Int. Cl.
*H04W 72/04* (2023.01)
*H04W 72/53* (2023.01)
(Continued)

(52) U.S. Cl.
CPC .......... *H04W 72/53* (2023.01); *H04W 8/24* (2013.01); *H04W 72/0446* (2013.01);
(Continued)

(58) Field of Classification Search
CPC ... H04W 72/53; H04W 8/24; H04W 72/0446; H04W 72/0453; H04W 72/21;
(Continued)

(56) References Cited

U.S. PATENT DOCUMENTS

| 2016/0174214 A1* | 6/2016 | Yerramalli | ............ H04W 76/27 370/329 |
| 2017/0366323 A1* | 12/2017 | Ahn | ...................... H04L 1/1861 |

(Continued)

FOREIGN PATENT DOCUMENTS

| EP | 3751923 A1 * | 12/2020 | ........... H04B 7/0626 |
| WO | WO-2019083249 A1 * | 5/2019 | ............... H04L 5/00 |

(Continued)

OTHER PUBLICATIONS

3GPP TS 38.213: "3rd Generation Partnership Project, Technical Specification Group Radio Access Network, NR, Physical Layer Procedures for Control (Release 16)", 3GPP TS 38.213, V16.1.0, Apr. 3, 2020 (Apr. 3, 2020), 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), XP051893821, pp. 1-156, , Retrieved from the Internet: URL:http://ftp.3gpp.org/Specs/archive/38_series/38.213/38213-g10.zip 38213-g10.docx [retrieved on Apr. 3, 2020] p. 17, line 3-p. 18, line 8, paragraph [0010], Section 9.

(Continued)

*Primary Examiner* — Vinncelas Louis
(74) *Attorney, Agent, or Firm* — Holland & Hart LLP

(57) ABSTRACT

Methods, systems, and devices for wireless communications are described. A user equipment (UE) may determine whether to perform a simplified uplink control information (UCI) multiplexing procedure or select an overlapping uplink channel having the highest priority and drop the remaining overlapping uplink channels. The UE may determine that a first symbol period of the physical uplink scheduled channel (PUSCH) is aligned with a first symbol period of the physical uplink control channel (PUCCH) and the UE may multiplex UCI with an uplink data transmission. The UE may transmit the multiplexed UCI and uplink data on the PUSCH and drop the PUCCH. The UE may perform (Continued)

UCI multiplexing for overlapping PUCCH and PUSCH, located on the same component carrier (CC). The UE may refrain from performing UCI multiplexing if the PUSCH and the PUCCH are located on different CCs, and may simultaneously transmit UCI and uplink data over the different CCs.

30 Claims, 20 Drawing Sheets

(51) Int. Cl.
```
H04W 72/0446    (2023.01)
H04W 8/24       (2009.01)
H04W 72/0453    (2023.01)
H04W 72/21      (2023.01)
H04W 72/23      (2023.01)
H04W 72/56      (2023.01)
H04L 5/00       (2006.01)
```

(52) U.S. Cl.
CPC ....... *H04W 72/0453* (2013.01); *H04W 72/21* (2023.01); *H04W 72/23* (2023.01); *H04W 72/56* (2023.01); *H04L 5/001* (2013.01)

(58) Field of Classification Search
CPC . H04W 72/23; H04W 72/56; H04W 52/0251; H04W 76/27; H04W 74/0808; H04L 5/001; H04L 1/1664; H04L 1/1854; H04L 1/1887; H04L 5/0023; H04L 5/14; H04L 5/0094; H04L 5/0044; H04L 5/0053; H04L 5/0064; H04L 1/1861; H04L 5/00; Y02D 30/70; H04B 7/0626
See application file for complete search history.

(56) References Cited

U.S. PATENT DOCUMENTS

| | | | | |
|---|---|---|---|---|
| 2020/0404692 A1* | 12/2020 | Yin | ........................ | H04L 1/1854 |
| 2022/0217773 A1* | 7/2022 | Wu | .................... | H04W 74/0808 |
| 2022/0322326 A1* | 10/2022 | Wong | .................... | H04L 1/1854 |
| 2023/0011110 A1* | 1/2023 | Shi | .................... | H04W 72/1273 |

FOREIGN PATENT DOCUMENTS

| | | |
|---|---|---|
| WO | WO-2019154356 A1 | 8/2019 |
| WO | WO-2021161446 A1 * | 8/2021 |

OTHER PUBLICATIONS

CATT: "Remaining Aspects of UCI Multiplexing on PUSCH", 3GPP Draft, 3GPP TSG RAN WG1 Meeting #92bis, R1-1803755, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018 Apr. 7, 2018 (Apr. 7, 2018), XP051413691, 6 Pages, Retrieved from the Internet: URL:http://www.3gpp.org/ftp/tsg%5Fran/WG1%5FRL1/TSGR1%5F92b/Docs/ [retrieved on Apr. 7, 2018], Section 2.2.
International Search Report and Written Opinion—PCT/US2021/031601—ISA/EPO—dated Aug. 10, 2021.
OPPO: "Remaining Issues for UL Control", 3GPP Draft, R1-1808893, 3GPP TSG RAN WG1 Meeting #94, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018 Aug. 10, 2018 (Aug. 10, 2018), XP051516264, 8 Pages, Retrieved from the Internet: URL:http://www.3gpp.org/ftp/tsg%5Fran/WG1%5FRL1/TSGR1%5F94/Docs/R1%2D1808893%2Ezip [retrieved on Aug. 10, 2018] Section 3.1.

* cited by examiner

UPLINK CONTROL INFORMATION MULTIPLEXING RULE SIMPLIFICATION FOR REDUCED CAPABILITY USER EQUIPMENTS

CROSS REFERENCE

The present Application for Patent claims the benefit of U.S. Provisional Patent Application No. 63/025,549 by Huang et al., entitled "UPLINK CONTROL INFORMATION MULTIPLEXING RULE SIMPLIFICATION FOR REDUCED CAPABILITY USER EQUIPMENTS," filed May 15, 2020, assigned to the assignee hereof, and expressly incorporated by reference herein.

FIELD OF TECHNOLOGY

The present disclosure relates to wireless communications and more specifically to uplink control information (UCI) multiplexing rule simplification for reduced capability user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some UEs may be full capability UEs or standard UEs. Some UEs may be reduced capability UEs.

SUMMARY

The described techniques relate to improved methods, systems, devices, and apparatuses that support uplink control information (UCI) multiplexing rule simplification for reduced capability user equipments (UEs). Generally, a reduced capability UE may determine that an uplink control channel (e.g., a physical uplink control channel (PUCCH)) and an uplink shared channel (e.g., a physical uplink shared channel (PUSCH)) overlap in time. In such examples, the reduced capability UEs may determine whether to perform a simplified UCI multiplexing procedure or select one of the overlapping uplink channels having the highest priority and drop the remaining overlapping uplink channels. For example, the reduced capability UE may determine whether a first symbol period of the PUSCH is aligned with a first symbol period of the PUCCH. If they are aligned, then the reduced capability UE may multiplex UCI with an uplink data transmission. The reduced capability UE may transmit the multiplexed UCI and uplink data on the PUSCH and drop the PUCCH. If they are not aligned, then the reduced capability UE may refrain from multiplexing the UCI and the uplink data, and may instead transmit on the channel having the highest priority level, dropping the other channels.

In some examples, a reduced capability UE may perform UCI multiplexing for overlapping PUCCH and PUSCH that are located on the same component carrier (CC). However, the reduced capability UE may refrain from performing UCI multiplexing if the PUSCH and the PUCCH are located on different CCs, and may instead simultaneously transmit UCI and uplink data over the different CCs.

A method of wireless communications at a UE is described. The method may include receiving a downlink control message indicating a grant of resources for an uplink data transmission on an uplink shared channel, determining that a first symbol period of the uplink shared channel is aligned with a first symbol period of an uplink control channel for UCI, multiplexing, based on determining that the first symbol period of the uplink shared channel is aligned with the first symbol period of the uplink control channel, the UCI and the uplink data transmission on the uplink shared channel, and transmitting the UCI and the uplink data transmission multiplexed on the uplink shared channel.

An apparatus for wireless communications at a UE is described. The apparatus may include a processor, memory coupled with the processor, and instructions stored in the memory. The instructions may be executable by the processor to cause the apparatus to receive a downlink control message indicating a grant of resources for an uplink data transmission on an uplink shared channel, determine that a first symbol period of the uplink shared channel is aligned with a first symbol period of an uplink control channel for UCI, multiplex, based on determining that the first symbol period of the uplink shared channel is aligned with the first symbol period of the uplink control channel, the UCI and the uplink data transmission on the uplink shared channel, and transmit the UCI and the uplink data transmission multiplexed on the uplink shared channel.

Another apparatus for wireless communications at a UE is described. The apparatus may include means for receiving a downlink control message indicating a grant of resources for an uplink data transmission on an uplink shared channel, determining that a first symbol period of the uplink shared channel is aligned with a first symbol period of an uplink control channel for UCI, multiplexing, based on determining that the first symbol period of the uplink shared channel is aligned with the first symbol period of the uplink control channel, the UCI and the uplink data transmission on the uplink shared channel, and transmitting the UCI and the uplink data transmission multiplexed on the uplink shared channel.

A non-transitory computer-readable medium storing code for wireless communications at a UE is described. The code may include instructions executable by a processor to receive a downlink control message indicating a grant of resources for an uplink data transmission on an uplink shared channel, determine that a first symbol period of the uplink shared channel is aligned with a first symbol period of an uplink control channel for UCI, multiplex, based on determining that the first symbol period of the uplink shared channel is aligned with the first symbol period of the uplink control channel, the UCI and the uplink data transmission on the uplink shared channel, and transmit the UCI and the uplink data transmission multiplexed on the uplink shared channel.

Some examples of the method, apparatuses, and non-transitory computer-readable medium described herein may further include operations, features, means, or instructions for determining, during a second transmission time interval, that a first uplink channel at least partially overlaps with a second uplink channel, and determining to drop one of the first uplink channel or the second uplink channel based on identifying that a first symbol period of the first uplink channel may be misaligned with a first symbol period of the second uplink channel.

Some examples of the method, apparatuses, and non-transitory computer-readable medium described herein may further include operations, features, means, or instructions for determining that the first uplink channel may have a first priority level and that the second uplink channel may have a second priority level that may be lower priority than the first priority level, transmitting an uplink message on the first uplink channel based on the second priority level being the lower priority than the first priority level, and dropping the second uplink channel based on the second priority level being the lower priority than the first priority level.

Some examples of the method, apparatuses, and non-transitory computer-readable medium described herein may further include operations, features, means, or instructions for identifying a first priority indicator for the first uplink channel and a second priority indicator for the second uplink channel, and comparing the first priority indicator and the second priority indicator, where determining that the first uplink channel may have the first priority level and that the second uplink channel may have the second priority level that may be lower priority than the first priority level may be based on comparing the first priority indicator and the second priority indicator.

Some examples of the method, apparatuses, and non-transitory computer-readable medium described herein may further include operations, features, means, or instructions for determining that the first symbol period of the first uplink channel may be first in time, where determining that the first uplink channel may have the first priority level and that the second uplink channel may have the second priority level that may be lower priority than the first priority level may be based on determining that the first symbol period of the first uplink channel may be first in time.

In some examples of the method, apparatuses, and non-transitory computer-readable medium described herein, the first uplink channel includes a second uplink control channel and the second uplink channel includes a third uplink control channel.

In some examples of the method, apparatuses, and non-transitory computer-readable medium described herein, the first uplink channel includes a second uplink shared channel and the second uplink channel includes a second uplink control channel.

In some examples of the method, apparatuses, and non-transitory computer-readable medium described herein, determining that the first symbol period of the uplink shared channel may be aligned with the first symbol period of the uplink control channel may include operations, features, means, or instructions for determining that a time between the first symbol period of the uplink shared channel and the first symbol period of the uplink control channel satisfies a threshold time.

Some examples of the method, apparatuses, and non-transitory computer-readable medium described herein may further include operations, features, means, or instructions for receiving a downlink data transmission on a downlink shared channel, where the UCI includes acknowledgement feedback corresponding to the data transmission on the downlink shared channel.

Some examples of the method, apparatuses, and non-transitory computer-readable medium described herein may further include operations, features, means, or instructions for determining that a first time between receiving the downlink data transmission and transmitting the acknowledgement feedback and the uplink data transmission satisfies a first threshold time, and determining that a second time between receiving the downlink control message and transmitting the acknowledgement feedback and the uplink data transmission satisfies a second threshold time, where multiplexing the acknowledgement feedback and the uplink data transmission may be based on the first time satisfying the first threshold time and the second time satisfying the second threshold time.

Some examples of the method, apparatuses, and non-transitory computer-readable medium described herein may further include operations, features, means, or instructions for identifying that the UE may be a first type of a set of UE types, the first type of UE of the set of UE types configured to perform a first UCI multiplexing procedure based on determining that the first symbol period of the uplink shared channel may be aligned with the first symbol period of the uplink control channel, and a second type of UE of the set of UEs configured to perform a second UCI multiplexing procedure based on determining that the first symbol period of the uplink shared channel may be aligned with the first symbol period of the uplink control channel, where the first UCI multiplexing procedure includes multiplexing the UCI and the uplink data transmission on the uplink shared channel.

In some examples of the method, apparatuses, and non-transitory computer-readable medium described herein, the first type of UE of the set of UE types may be associated with a first capability level and a second type of UE of the set of UE types may be associated with a second capability level.

In some examples of the method, apparatuses, and non-transitory computer-readable medium described herein, multiplexing the UCI and the uplink data transmission may include operations, features, means, or instructions for multiplexing a payload of the uplink control channel with a payload of the uplink shared channel to generate a multiplexed payload, where transmitting both the UCI and the uplink data transmission includes transmitting the multiplexed payload.

In some examples of the method, apparatuses, and non-transitory computer-readable medium described herein, multiplexing the UCI and the uplink data transmission further may include operations, features, means, or instructions for dropping the uplink control channel.

In some examples of the method, apparatuses, and non-transitory computer-readable medium described herein, the UCI includes channel state information, or a scheduling request, or acknowledgement feedback, or a combination thereof.

A method of wireless communications at a UE is described. The method may include receiving a downlink control message indicating a grant of resources for an uplink data transmission on an uplink shared channel of a second CC, the uplink shared channel at least partially overlapping with an uplink control channel for UCI on a first CC, identifying that the UE is a first type of a set of UE types, where a second type of the set of UE types is associated with multiplexing UCI and uplink data transmissions across multiple CCs, and transmitting, based on the UE being the first type, the UCI on the uplink control channel on the first CC and the uplink data transmission on the uplink shared channel on the second CC.

An apparatus for wireless communications at a UE is described. The apparatus may include a processor, memory coupled with the processor, and instructions stored in the memory. The instructions may be executable by the processor to cause the apparatus to receive a downlink control message indicating a grant of resources for an uplink data transmission on an uplink shared channel of a second CC, the uplink shared channel at least partially overlapping with an uplink control channel for UCI on a first CC, identify that the UE is a first type of a set of UE types, where a second type of the set of UE types is associated with multiplexing UCI and uplink data transmissions across multiple CCs, and transmit, based on the UE being the first type, the UCI on the uplink control channel on the first CC and the uplink data transmission on the uplink shared channel on the second CC.

Another apparatus for wireless communications at a UE is described. The apparatus may include means for receiving a downlink control message indicating a grant of resources for an uplink data transmission on an uplink shared channel of a second CC, the uplink shared channel at least partially overlapping with an uplink control channel for UCI on a first CC, identifying that the UE is a first type of a set of UE types, where a second type of the set of UE types is associated with multiplexing UCI and uplink data transmissions across multiple CCs, and transmitting, based on the UE being the first type, the UCI on the uplink control channel on the first CC and the uplink data transmission on the uplink shared channel on the second CC.

A non-transitory computer-readable medium storing code for wireless communications at a UE is described. The code may include instructions executable by a processor to receive a downlink control message indicating a grant of resources for an uplink data transmission on an uplink shared channel of a second CC, the uplink shared channel at least partially overlapping with an uplink control channel for UCI on a first CC, identify that the UE is a first type of a set of UE types, where a second type of the set of UE types is associated with multiplexing UCI and uplink data transmissions across multiple CCs, and transmit, based on the UE being the first type, the UCI on the uplink control channel on the first CC and the uplink data transmission on the uplink shared channel on the second CC.

Some examples of the method, apparatuses, and non-transitory computer-readable medium described herein may further include operations, features, means, or instructions for refraining, based on the UE being the first type, from multiplexing the UCI and the uplink data transmission on the first CC; or, refraining, based on the UE being the first type, from multiplexing the UCI and the uplink data transmission on the second CC; or both.

In some examples of the method, apparatuses, and non-transitory computer-readable medium described herein, the first type of UE of the set of UE types may be configured to perform a first UCI multiplexing procedure including transmitting the uplink control channel on the first CC and the uplink data transmission on the uplink shared channel on the second CC, and where a second type of UE of the set of UEs configured to perform a UCI multiplexing second procedure.

Some examples of the method, apparatuses, and non-transitory computer-readable medium described herein may further include operations, features, means, or instructions for receiving a second downlink control message indicating a grant of resources for a second uplink data transmission on a second uplink shared channel of the first CC, the second uplink data transmission at least partially overlapping with a second uplink control channel for second UCI, and transmitting, based on the UE being the first type, both the second UCI and the second uplink data transmission over the second uplink shared channel on the first CC.

In some examples of the method, apparatuses, and non-transitory computer-readable medium described herein, transmitting both the second UCI and the second uplink data transmission may include operations, features, means, or instructions for multiplexing the second UCI and the second uplink data transmission on the first CC.

Some examples of the method, apparatuses, and non-transitory computer-readable medium described herein may further include operations, features, means, or instructions for transmitting, based on the UE being the first type, both the second UCI and the uplink data transmission on the uplink shared channel on the second CC.

In some examples of the method, apparatuses, and non-transitory computer-readable medium described herein, the UCI includes channel state information, or a scheduling request, or acknowledgement feedback, or a combination thereof.

A method of wireless communications at a base station is described. The method may include transmitting a downlink control message indicating a grant of resources for an uplink data transmission on an uplink shared channel, determining that a first symbol period of the uplink shared channel is aligned with a first symbol period of an uplink control channel for UCI, and receiving, based on determining that the first symbol period of the uplink shared channel is aligned with the first symbol period of the uplink control channel, the UCI and the uplink data transmission multiplexed on the uplink shared channel.

An apparatus for wireless communications at a base station is described. The apparatus may include a processor, memory coupled with the processor, and instructions stored in the memory. The instructions may be executable by the processor to cause the apparatus to transmit a downlink control message indicating a grant of resources for an uplink data transmission on an uplink shared channel, determine that a first symbol period of the uplink shared channel is aligned with a first symbol period of an uplink control channel for UCI, and receive, based on determining that the first symbol period of the uplink shared channel is aligned with the first symbol period of the uplink control channel, the UCI and the uplink data transmission multiplexed on the uplink shared channel.

Another apparatus for wireless communications at a base station is described. The apparatus may include means for transmitting a downlink control message indicating a grant of resources for an uplink data transmission on an uplink shared channel, determining that a first symbol period of the uplink shared channel is aligned with a first symbol period of an uplink control channel for UCI, and receiving, based on determining that the first symbol period of the uplink shared channel is aligned with the first symbol period of the uplink control channel, the UCI and the uplink data transmission multiplexed on the uplink shared channel.

A non-transitory computer-readable medium storing code for wireless communications at a base station is described. The code may include instructions executable by a processor to transmit a downlink control message indicating a grant of resources for an uplink data transmission on an uplink shared channel, determine that a first symbol period of the uplink shared channel is aligned with a first symbol period of an uplink control channel for UCI, and receive, based on determining that the first symbol period of the uplink shared channel is aligned with the first symbol period of the uplink control channel, the UCI and the uplink data transmission multiplexed on the uplink shared channel.

In some examples of the method, apparatuses, and non-transitory computer-readable medium described herein, a first uplink channel at least partially overlaps with a second uplink channel, and where a first symbol period of the first uplink channel may be not aligned with a first symbol period of the second uplink channel.

Some examples of the method, apparatuses, and non-transitory computer-readable medium described herein may further include operations, features, means, or instructions for receiving an uplink message over the first uplink channel based on the first priority level and the second priority level.

Some examples of the method, apparatuses, and non-transitory computer-readable medium described herein may further include operations, features, means, or instructions for transmitting a second downlink control message including a grant of resources corresponding to an uplink data transmission on the first uplink channel, the downlink control message including a first priority indicator for the first uplink channel, and transmitting a third downlink control message including a grant of resources corresponding to a downlink data transmission on a second downlink shared channel, where UCI including an acknowledgement feedback message on the second uplink channel corresponds to the downlink data transmission on the second downlink shared channel, the third downlink control message including a second priority indicator for the second uplink channel.

A method of wireless communications at a base station is described. The method may include identifying that a UE is a first type of a set of UE types, where a second type of the set of UE types is associated with multiplexing UCI and uplink data transmissions across multiple CCs, transmitting, to the UE, a downlink control message indicating a grant of resources for an uplink data transmission on an uplink shared channel of a second CC, the uplink shared channel at least partially overlapping with an uplink control channel for UCI on a first CC, and receiving, based on the UE being the first type, the UCI on the uplink control channel on the first CC and the uplink data transmission on the uplink shared channel of the second CC.

An apparatus for wireless communications at a base station is described. The apparatus may include a processor, memory coupled with the processor, and instructions stored in the memory. The instructions may be executable by the processor to cause the apparatus to identify that a UE is a first type of a set of UE types, where a second type of the set of UE types is associated with multiplexing UCI and uplink data transmissions across multiple CCs, transmit, to the UE, a downlink control message indicating a grant of resources for an uplink data transmission on an uplink shared channel of a second CC, the uplink shared channel at least partially overlapping with an uplink control channel for UCI on a first CC, and receive, based on the UE being the first type, the UCI on the uplink control channel on the first CC and the uplink data transmission on the uplink shared channel of the second CC.

Another apparatus for wireless communications at a base station is described. The apparatus may include means for identifying that a UE is a first type of a set of UE types, where a second type of the set of UE types is associated with multiplexing UCI and uplink data transmissions across multiple CCs, transmitting, to the UE, a downlink control message indicating a grant of resources for an uplink data transmission on an uplink shared channel of a second CC, the uplink shared channel at least partially overlapping with an uplink control channel for UCI on a first CC, and receiving, based on the UE being the first type, the UCI on the uplink control channel on the first CC and the uplink data transmission on the uplink shared channel of the second CC.

A non-transitory computer-readable medium storing code for wireless communications at a base station is described. The code may include instructions executable by a processor to identify that a UE is a first type of a set of UE types, where a second type of the set of UE types is associated with multiplexing UCI and uplink data transmissions across multiple CCs, transmit, to the UE, a downlink control message indicating a grant of resources for an uplink data transmission on an uplink shared channel of a second CC, the uplink shared channel at least partially overlapping with an uplink control channel for UCI on a first CC, and receive, based on the UE being the first type, the UCI on the uplink control channel on the first CC and the uplink data transmission on the uplink shared channel of the second CC.

In some examples of the method, apparatuses, and non-transitory computer-readable medium described herein, the first type of UE of the set of UE types may be configured to perform a first UCI multiplexing procedure including transmitting the uplink control channel on the first CC and the uplink data transmission on the uplink shared channel on the second CC, and where a second type of UE of the set of UEs configured to perform a second UCI multiplexing procedure.

Some examples of the method, apparatuses, and non-transitory computer-readable medium described herein may further include operations, features, means, or instructions for transmitting a second downlink control message indicating a grant of resources for a second uplink data transmission on a second uplink shared channel of the first CC, the second uplink data transmission at least partially overlapping with a second uplink control channel for second UCI, and receiving, based on the UE being the first type, both the second UCI and the second uplink data transmission over the second uplink shared channel on the first CC.

In some examples of the method, apparatuses, and non-transitory computer-readable medium described herein, the second UCI and the second uplink data transmission may be multiplexed on the first CC.

DETAILED DESCRIPTION

Figure 1:
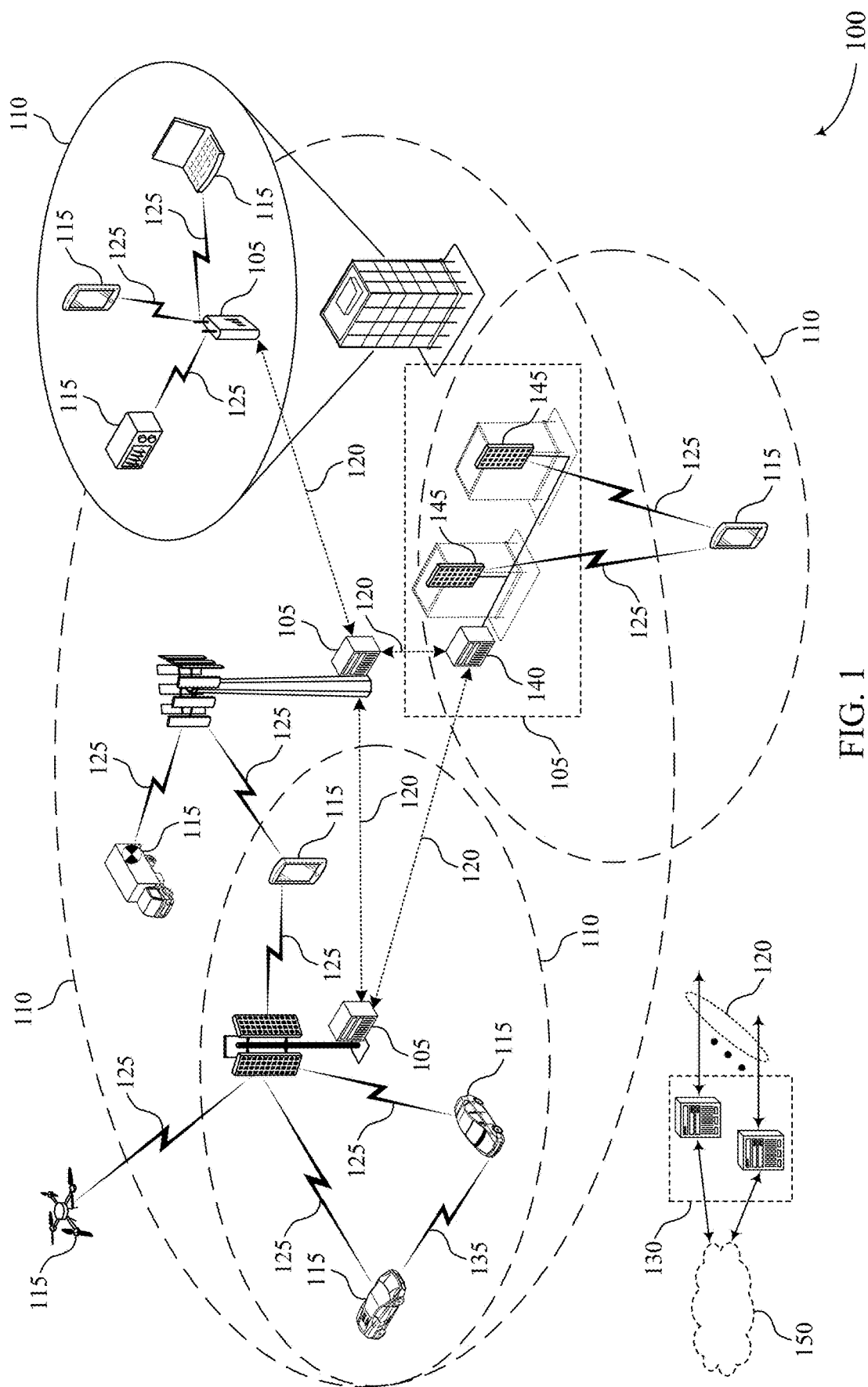
FIG. 1 illustrates an example of a system for wireless communications that supports uplink control information (UCI) multiplexing rule simplification for reduced capability user equipments (UEs) in accordance with aspects of the present disclosure.

Some wireless communications systems may support communication with various types of user equipments (UEs). For example, a standard UE or full capability UE may be a UE that is capable of standard communications protocols, or has a standard set of capabilities. A reduced capability UE (e.g., a RedCap device or a RedCap UE), may be a UE that has reduced capabilities with respect to the standard set of capabilities, reduced available power or a smaller battery, or a limited amount of processing resources or capabilities. A reduced capability UE may be, for example, a wearable device, such as a watch or other wrist band device (e.g., a smart watch, an activity tracker), a headset, a head mounted display (HMD), a sensor, or a device that prioritizes battery life or operates in low power or battery efficient mode.

In some examples, a wireless communications system (e.g., a new radio (NR) system) may support uplink control information (UCI) multiplexing. For example, an uplink control channel (e.g., a physical uplink control channel (PUCCH)) and an uplink shared channel (e.g., a physical uplink shared channel (PUSCH)) may at least partially overlap. In such examples, a UE may multiplex UCI scheduled to be transmitted over the PUCCH with an uplink data transmission scheduled to be transmitted over the PUSCH, and may multiplex the UCI with the uplink data transmission on the PUSCH. For instance, a UE may receive an uplink grant for an uplink data transmission, and may also receive a downlink data transmission. UCI including feedback acknowledgement signaling corresponding to the downlink data transmission on a PUCCH and the uplink data transmission on a PUSCH may at least partially overlap. In such examples, a standard UE may perform a highly complex UCI multiplexing procedure. Such a procedure may be particularly complex due to time check procedures (e.g., which may be referred to as timeline check procedures), cross-component carrier (CC) UCI multiplexing, or the like. However, such complicated processes as part of a UCI multiplexing procedure may result in a large power expenditure for a standard device. A reduced capability UE may not be able to perform such highly complex UCI multiplexing procedures, or may experience excessive power loss as a result of such complex UCI multiplexing procedures.

Instead, to avoid excessive power expenditures, a reduced capability UE may perform a simplified UCI multiplexing procedure, or may refrain from performing a UCI multiplexing procedure under some conditions. For instance, a reduced capability UE may determine if a first symbol of a PUCCH and a first symbol of a PUSCH that overlaps with the PUCCH are aligned in time. If the first symbols of the respective PUCCH and PUSCH are aligned (e.g., if the first symbol of the PUCCH is a threshold amount of time from the first symbol of the PUSCH), then the reduced capability UE may multiplex a UCI message with the uplink data transmission (e.g., may multiplex the payload of the UCI with an uplink data message on the PUSCH, and drop the PUCCH) without having to perform a complicated time check. In some examples, the PUCCH may be scheduled on a first CC and the PUSCH may be scheduled on a second CC. Performing UCI multiplexing across CCs may be a time-consuming procedure resulting in a large power expenditure. A reduced capability UE may transmit the UCI on the PUCCH on the first CC and may transmit the uplink data message on the PUSCH on the second CC instead of multiplexing the UCI and the uplink data transmission onto a single CC.

Particular aspects of the subject matter described herein may be implemented to realize one or more advantages. The described techniques may support improvements in system efficiency and power efficiency. A reduced capability UE may effectively and efficiently determine whether to perform simplified UCI multiplexing procedures, resulting in decreased power expenditures, increased efficiency, extended battery life, decreased system congestion, improved system reliability, and increased user experience.

Aspects of the disclosure are initially described in the context of wireless communications systems. Aspects of the disclosure are further illustrated by and described with reference to multiplexing schemes and process flows. Aspects of the disclosure are further illustrated by and described with reference to apparatus diagrams, system diagrams, and flowcharts that relate to UCI multiplexing rule simplification for reduced capability UEs.

FIG. 1 illustrates an example of a wireless communications system 100 that supports UCI multiplexing rule simplification for reduced capability UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a reduced capability UE 115 may determine that an uplink control channel (e.g., a PUCCH) and an uplink shared channel (e.g., a PUSCH) overlap in time. In such examples, the reduced capability UEs may determine whether to perform a simplified UCI multiplexing procedure or select one of the overlapping uplink channels having the highest priority and drop the remaining overlapping uplink channels. For example, the reduced capability UE 115 may determine whether a first symbol period of the PUSCH is aligned with a first symbol period of the PUCCH. If they are aligned, then the reduced capability UE 115 may multiplex UCI with an uplink data transmission. The reduced capability UE 115 may transmit the multiplexed UCI and uplink data on the PUSCH and drop the PUCCH. If they are not aligned, then the reduced capability UE 115 may refrain from multiplexing the UCI and the uplink data, and may instead transmit on the channel having the highest priority level, dropping the other channels.

Figure 2:
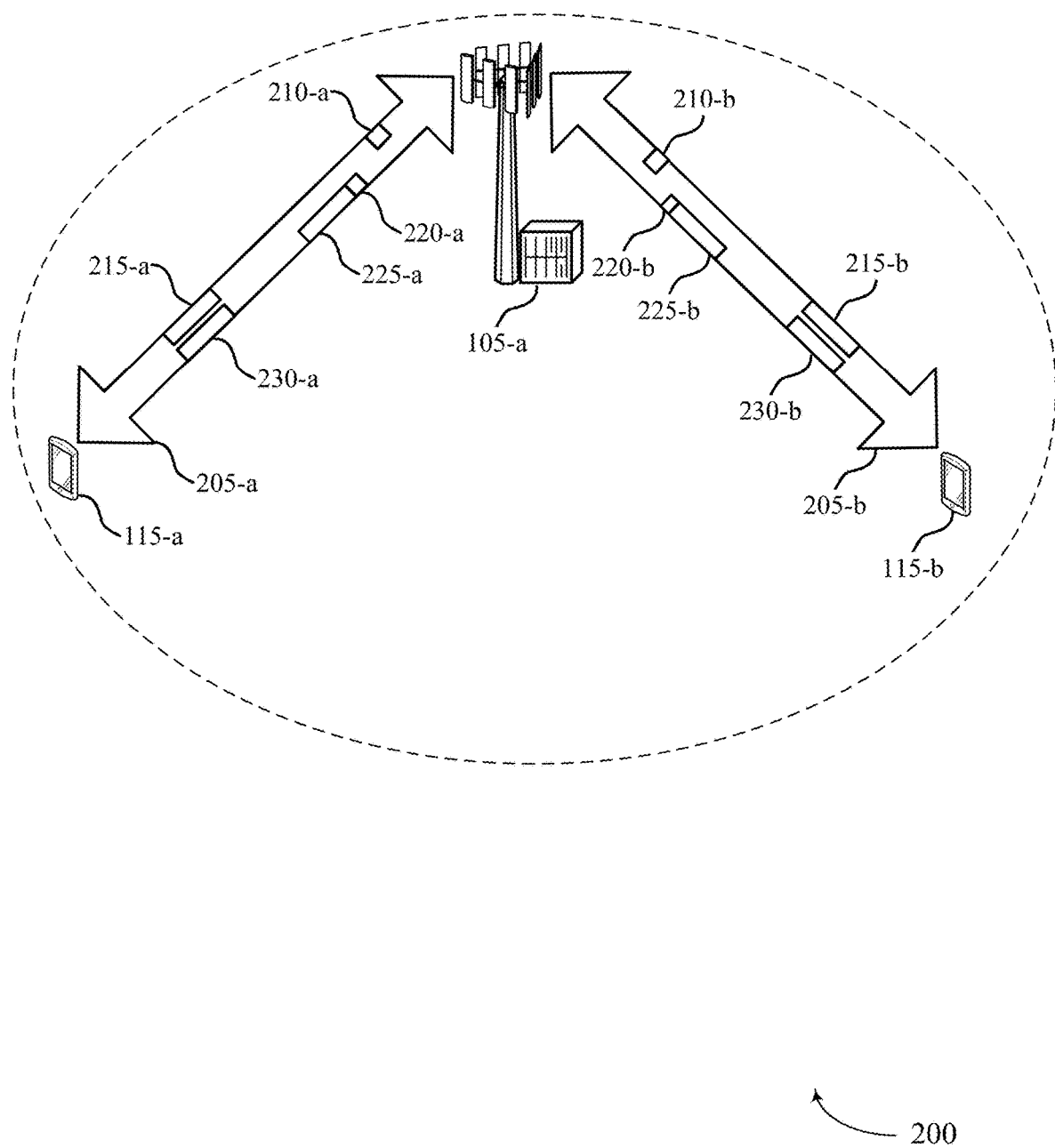
FIG. 2 illustrates an example of a wireless communications system that supports UCI multiplexing rule simplification for reduced capability UEs in accordance with aspects of the present disclosure.

In some examples, a reduced capability UE 115 may perform UCI multiplexing for overlapping PUCCH and PUSCH that are located on the same CC. However, the reduced capability UE 115 may refrain from performing UCI multiplexing if the PUSCH and the PUCCH are located on different CCs, and may instead simultaneously transmit UCI and uplink data over the different CCs FIG. 2 illustrates an example of a wireless communications system 200 that supports UCI multiplexing rule simplification for reduced capability UEs in accordance with aspects of the present disclosure. In some examples, wireless communications system 200 may implement aspects of wireless communications system 100. Wireless communications system 200 may include a base station 105-a, a UE 115-a, and a UE 115-b, which may be examples of corresponding devices described with reference to FIG. 1. UE 115-a may be a standard UE 115. UE 115-b may be a reduced capability UE 115.

Base station 105-a may communicate with various UEs 115. For instance, base station 105-a may communicate with UE 115-a via bidirectional communication link 205-a. UE 115-a may perform UCI multiplexing procedures. For example, if PUCCH 230-a and PUSCH 215-a overlap in time, UE 115-a may multiplex UCI from PUCCH 230-a with uplink data from PUSCH 215-a on PUSCH 215-a. UCI scheduled on overlapping PUCCH 230-a may include acknowledgement feedback (e.g., acknowledgement (ACK) messages or negative acknowledgement (NACK) messages), periodic channel state information (P-CSI) reports, semi-persistent CSI (SP-CSI) reports, HARQ ACK and scheduling request (SR), scheduling requests, HARQ ACK with SR and CSI, or any combination thereof. As described herein, UCI multiplexing may include multiplexing any of the above-described UCI with uplink data on a PUSCH.

In some examples, UE 115-a and base station 105-a may multiplex UCI including, for instance, HARQ ACK feedback. Base station 105-a may transmit a physical downlink control channel (PDCCH) 210-a including a scheduling grant for an uplink data transmission on a PUSCH 215-a. Base station 105-a may also transmit a PDCCH 220-a with a downlink grant for a downlink data transmission over physical downlink shared channel (PDSCH) 225-a. UE 115-a may transmit an acknowledgment feedback message (e.g., an ACK message or NACK message) over PUCCH 230-a associated with the downlink data transmission sent over PDSCH 225-a. PUCCH 230-a and PUSCH 215-a may overlap at least partially in time. In such examples, UE 115-a may perform a complex UCI multiplexing procedure, as described in greater detail with reference to FIG. 3. For example, UE 115-a may perform a timing check procedure as described with reference to FIG. 3, or a cross-CC UCI multiplexing procedure as described with reference to FIG. 5. Such UCI multiplexing procedures for a standard UE 115 may consume excessive power, rely on use of unavailable computation resources, or the like, resulting in one or more failed transmissions, system congestion, increased latency, and decreased user experience.

Base station 105-a may also communicate with UE 115-b via bidirectional communication link 205-b. UE 115-b may be a reduced capability UE. In some examples, base station 105-b may transmit a PDCCH 210-b including a scheduling grant for an uplink data transmission on a PUSCH 215-b. Base station 105-a may also transmit a PDCCH 220-b with a downlink grant for a downlink data transmission over PDSCH 225-b. UE 115-b may transmit an acknowledgment feedback message (e.g., an ACK message or a NACK message) over PUCCH 230-b associated with the downlink data transmission sent over PDSCH 225-b. PUCCH 230-b and PUSCH 215-b may overlap at least partially in time. To decrease power consumption, or to avoid complex procedures that exceed its capabilities, UE 115-b may perform a simplified UCI multiplexing procedure, as described in greater detail with reference to FIGS. 4 and 6. In some examples, UE 115-a may refrain from performing cross-CC UCI multiplexing, as described with reference to FIGS. 5 and 6.

Figure 3:
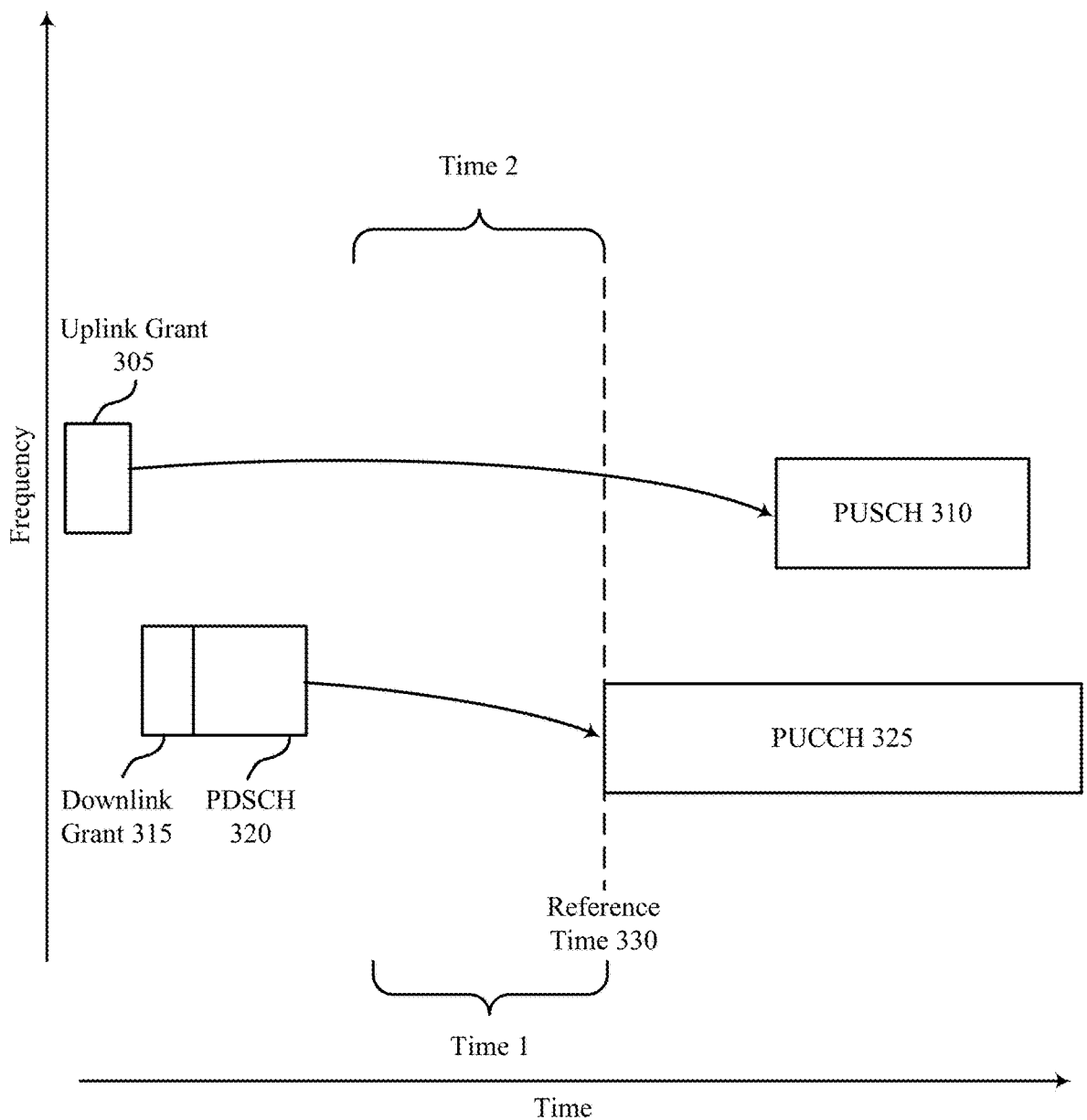
FIG. 3 illustrates an example of a wireless a multiplexing scheme that supports UCI multiplexing rule simplification for reduced capability UEs in accordance with aspects of the present disclosure.

FIG. 3 illustrates an example of a multiplexing scheme 300 that supports UCI multiplexing rule simplification for reduced capability UEs in accordance with aspects of the present disclosure. In some examples, multiplexing scheme 300 may implement aspects of wireless communications system 100 and wireless communications system 200.

In some examples, a base station 105 and a UE 115 (e.g., a standard UE) may communicate as described with reference to FIG. 2. The base station 105 may transmit an uplink grant 305 to a UE 115. Uplink grant 305 may be included in a PDCCH, and may indicate resources for an uplink data transmission over PUSCH 310. Base station 105 may also transmit a downlink grant 315 over a PDCCH, including grant of resources for a downlink data transmission over PDSCH 320. The UE 115 may transmit an acknowledgement feedback message (e.g., an ACK message or a NACK message) indicating whether the UE 115 has received the downlink data transmission over PDSCH 320. The UE 115 may transmit the acknowledgement feedback message over the PUCCH 325. In some examples, PUSCH 310 and PUCCH 325 may at least partially overlap in time. In such cases, the UE 115 may perform a UCI multiplexing procedure. For example, the UE 115 may multiplex the payload of the acknowledgement feedback message with the uplink data transmission on PUSCH 310, and may drop (e.g., disconnect, refrain from communicating on) PUCCH 325.

If the UE 115 is a standard UE, then the UE 115 may perform, as part of the UCI multiplexing procedure, a time check for the PUSCH 310 and the PUCCH 325. The UE 115 may determine, by performing the time check, whether the PUSCH 310 and the PUCCH 325 are legitimate candidates for UCI multiplexing. That is, if PUSCH 310 and PUCCH 325 pass the time check, then UE 115 may determine that they are legitimate candidates for the UCI multiplexing procedure and may multiplex the acknowledgment feedback message and the uplink data transmission on PUSCH 310.

To perform the time check, UE 115 may determine whether it has sufficient processing capabilities (processing capabilities 1) to receive PDSCH 320, process PDSCH 320, prepare PUCCH 325, and potentially multiplex the acknowledgement message for PUCCH 325 and the uplink data transmission for PUSCH 310 within time 1

(e.g., $T_{proc,1}^{mux}$).

UE 115 may further determine whether it has sufficient processing capabilities to receive uplink grant 305, process uplink grant 305, prepare PUSCH 310, and potentially multiplex the acknowledgment feedback message and the uplink data transmission within time 2 (e.g., $T_{proc,2}^{mux}$). To do so, UE 115 may identify reference time 330. UE 115 may identify the first symbol period of an overlapping channel. For instance, the first symbol period PUCCH 325 may be earlier than the first symbol period of PUSCH 310, so reference time 330 may be aligned with a symbol boundary of the first symbol period of PUCCH 325. UE 115 may then determine whether uplink grant 305 precedes reference time 330 by at least time 2, and whether PDSCH 320 precede PUCCH 325 by at least time 1. That is, if the last PDSCH symbol of PDSCH 320 corresponding to the acknowledgement feedback message on PUCCH 325 precedes reference time 330 minus T1, then PUCCH 325 may be a legitimate candidate for UCI multiplexing. If both uplink grant 305 and downlink grant 315 precede reference time 330 by at least time 2, then PUSCH 310 and PUCCH 325 may be legitimate candidates for UCI multiplexing. In such cases, UE 115 may perform UCI multiplexing procedures based on the successful time check. However, if PDSCH 320 does not precede reference time 330 by time 1, or if either uplink grant 305 or downlink grant 315 do not precede reference time 330 by at least time 2, then UE 115 may refrain from performing UCI multiplexing procedures on PUSCH 310 and PUCCH 325.

In some examples, UE 115 may calculate time 1 and time 2 based on one or more parameters. For example, UE 115 may determine capability 1 and capability 2, and may calculate time 1 and time 2, respectively, based thereon. In some examples, UE 115 may calculate time 1 and time 2 based on a numerology (e.g., a transmission time interval (TTI) duration, a subcarrier spacing (SCS), or the like) of one or more channels. For example, time 1 and time 2 may be based on a numerology of one or more of a PDCCH carrying uplink grant 305, PUSCH 310, a PDCCH carrying downlink grant 315, PDSCH 320, PUCCH 325, or a combination thereof. Such calculations may use computational resources or expend a large amount of power or both.

A reduced capability UE 115 may not have sufficient power or computational resources available to perform such expensive calculations, or to perform such expensive time check procedures. Instead, a reduced capability UE 115 may perform a simplified UCI procedure that omits or simplifies the time check procedures, as described in greater detail with reference to FIG. 4.

Figure 4:
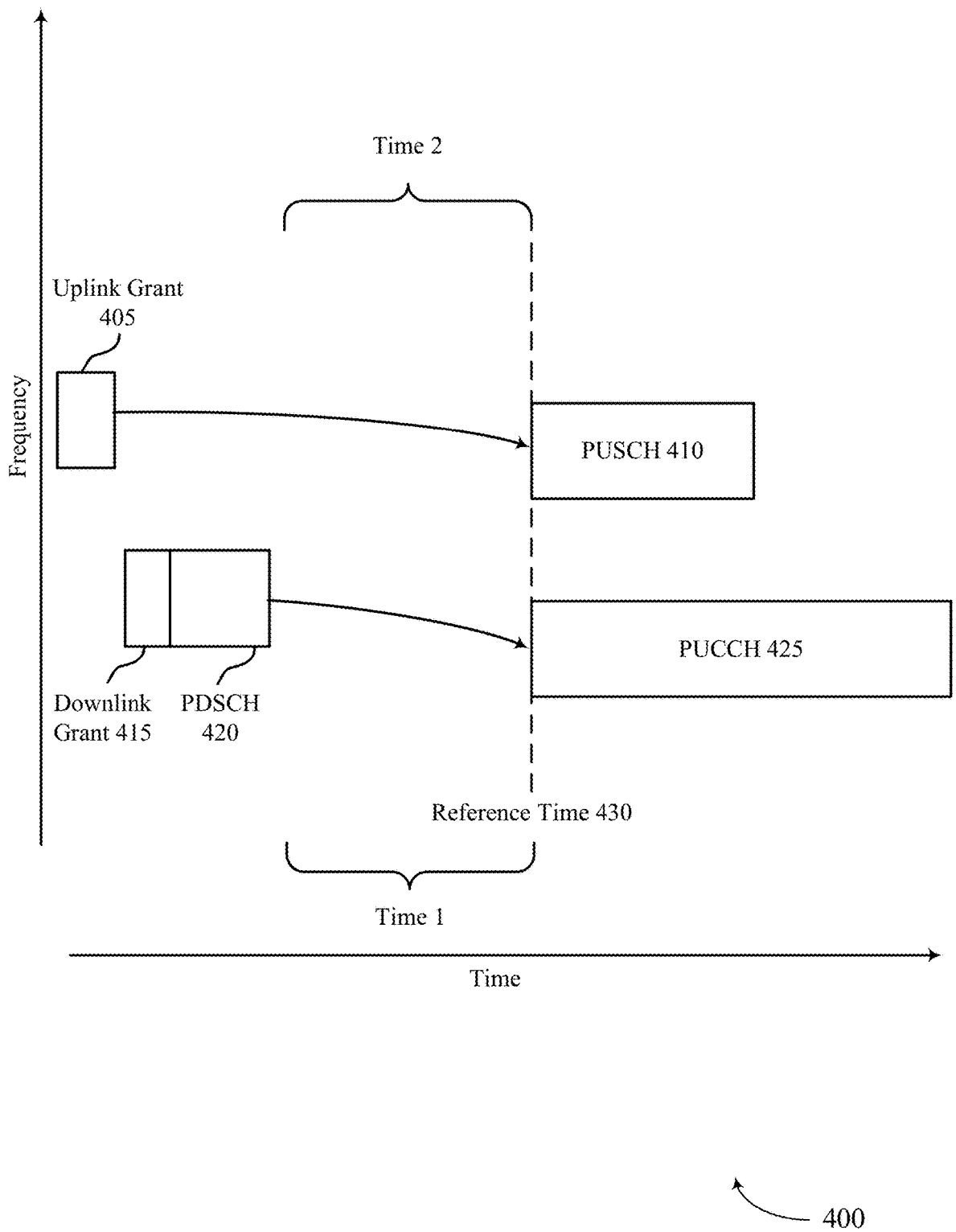
FIG. 4 illustrates an example of a multiplexing scheme that supports UCI multiplexing rule simplification for reduced capability UEs in accordance with aspects of the present disclosure.

FIG. 4 illustrates an example of a multiplexing scheme 400 that supports UCI multiplexing rule simplification for reduced capability UEs in accordance with aspects of the present disclosure. In some examples, multiplexing scheme 400 may implement aspects of wireless communications system 100 and wireless communications system 200.

In some examples, a base station 105 may communicate with the UE 115, as described with reference to FIG. 2. The base station 105 may transmit an uplink grant 405 to the UE 115. Uplink grant 405 may be included in a PDCCH, and may indicate resources for an uplink data transmission over PUSCH 410. Base station 105 may also transmit a downlink grant 415 over a PDCCH, including a grant of resources for a downlink data transmission over PDSCH 420. The UE 115 may transmit an acknowledgement feedback message (e.g., an ACK message or a NACK message) indicating whether the UE 115 has received the downlink data transmission over PDSCH 420. The UE 115 may transmit the acknowledgement feedback message over the PUCCH 425. In some examples, PUSCH 410 and PUCCH 425 may at least partially overlap in time. In such cases, where the UE 115 is a reduced capability UE, the UE 115 may perform a simplified UCI multiplexing procedure. For example, the UE 115 may multiplex the payload of the acknowledgement feedback message with the uplink data transmission on PUSCH 410, and may drop PUCCH 425.

A reduced capabilities UE 115 may perform a simplified UCI multiplexing procedure. That is, a time check for reduced capability UEs may be removed from the procedure. For example, UE 115 may simply determine whether the first symbol period of PUSCH 410 and a first symbol period of PUCCH 425 are aligned. If the first symbol periods of PUSCH 410 and PUCCH 425 are aligned in time, then UE 115 may multiplex the acknowledgement feedback message with the uplink data transmission on PUSCH 410, as described herein.

UE 115 may perform UCI multiplexing when independent timing requirements are met. For instance, UE 115 may be able to multiplex the acknowledgement feedback message and the uplink data transmission when uplink grant 405 precedes PUSCH 410 by at least time T2. T2 may represent an amount of time to receive uplink grant 405 and prepare PUSCH 410, and multiplex the acknowledgement feedback message and the uplink data transmission. Similarly, UE 115 may be able to multiplex the acknowledgement feedback message and the uplink data transmission when PDSCH 420 precedes PUCCH 425 by at least time T1. However, UE 115 may assume that base station 105 may schedule PUSCH 410 and PUCCH 425 to satisfy T1 and T2. Thus, UE 115 may avoid expending resources calculating T1 and T2. Additionally, UE 115 may perform UCI multiplexing without performing joint time checks for PUSCH 410 and PUCCH 425. In some examples, UE 115 may not calculate T1 and T2, and may avoid determining whether PUSCH 410 and PUCCH 425 are legitimate candidates based on the time checks.

Instead, UE 115 may simply determine whether a first symbol of PUSCH 410 and a first symbol of PUCCH 425 are aligned in time. If so, UE 115 may multiplex the acknowledgement feedback message and the uplink data transmission on PUSCH 410. If not, UE 115 may transmit the acknowledgement feedback message on PUCCH 425 and may transmit the uplink data transmission on PUSCH 410.

In some examples, UE 115 may consider PUSCH 410 and PUCCH 425 aligned in time if a symbol boundary for the first symbol period of PUSCH 410 and the first symbol period of PUCCH 425 are the same. In some examples, UE 115 may consider PUSCH 410 and PUCCH 425 aligned in time if the first symbol period of PUSCH 410 and the first symbol period of PUCCH 425 are sufficiently close to each other in time. For instance, UE 115 may determine whether the first symbol period of PUSCH 410 is within a threshold amount of time or a threshold number of TTIs (e.g., symbols, slots, or the like) from the first symbol period of PUCCH 425.

If PUSCH 410 and PUCCH 425 are not aligned in time, then UE 115 may refrain from multiplexing the acknowledgement feedback message and the uplink data transmission. Instead, UE 115 may determine which of PUSCH 410 and PUCCH 425 has a higher priority level. In such cases, UE 115 may transmit over the uplink channel have the highest priority level, and may drop all other overlapping uplink channels. For example, UE 115 may determine which of PUSCH 410 and PUCCH 425 has a higher priority level.

UE 115 may determine which of PUSCH 410 and PUCCH 425 has the highest priority level based on a priority label or a priority indicator for each channel. UE 115 may identify the priority indicators for each channel based on respective grants (e.g., uplink grant 405 for PUSCH 410 and downlink grant 415 for PUCCH 425), or based on configuration information (e.g., received via higher layer signaling such as RRC signaling, or based on standardized information, one or more priority rules, or the like). In some examples, a downlink grant 415 may include a priority indicator for PUCCH 425. In some examples, a downlink grant 415 may include a priority indicator for PDSCH 420, and UE 115 may determine a priority level for PUCCH 425 based on the priority indicator for PDSCH 420. For instance, UE 115 may compare a priority indicator for PUSCH 410 with a priority indicator for PDSCH 420.

UE 115 may determine which uplink channel has the highest priority level based on timing. For instance, UE 115 may determine which of PUSCH 410 and PUCCH 425 is the highest priority channel based on which channel has the earliest starting OFDM symbol. That is, if the first symbol period of PUSCH 410 precedes the first symbol period of PUCCH 425, then PUSCH 410 is the priority channel and PUCCH 425 is the non-priority channel. In such examples, UE 115 may multiplex acknowledgement feedback message and the uplink data transmission on PUSCH 410, and may drop PUCCH 425.

PUSCH 410 and PUCCH 425 may be located on the same CC. In some examples, a PUSCH and a PUCCH may overlap across different CCs. In such examples, a reduced capability UE 115 may refrain from performing UCI multiplexing procedures, as described in greater detail with reference to FIG. 5.

Figure 5:
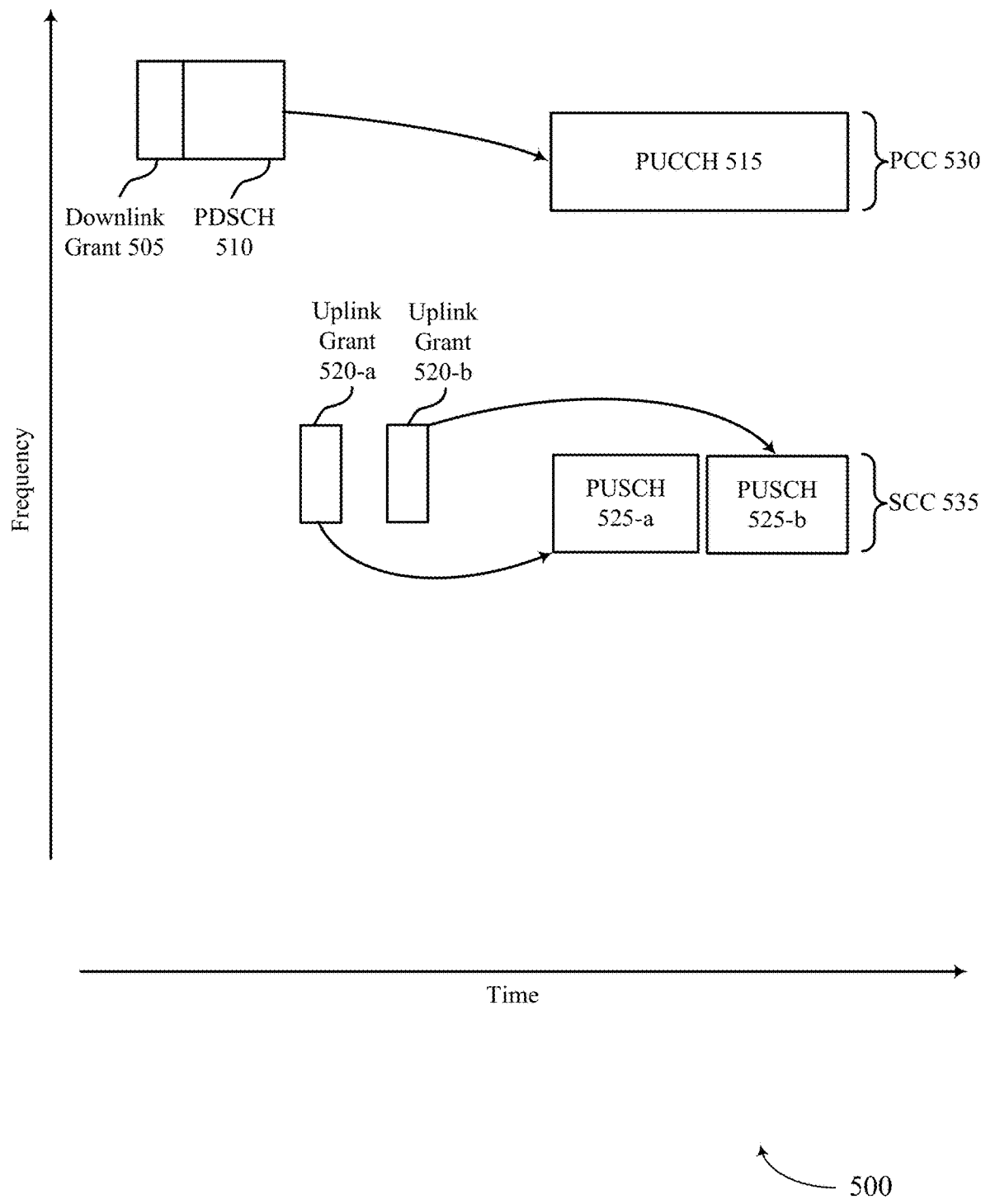
FIG. 5 illustrates an example of a multiplexing scheme that supports UCI multiplexing rule simplification for reduced capability UEs in accordance with aspects of the present disclosure.

FIG. 5 illustrates an example of a multiplexing scheme 500 that supports UCI multiplexing rule simplification for reduced capability UEs in accordance with aspects of the present disclosure. In some examples, multiplexing scheme 500 may implement aspects of wireless communications system 100 and wireless communications system 200.

In some examples, a base station 105 may communicate with a UE 115 (e.g., a standard capability UE 115 or a reduced capability UE 115). For instance, base station 105 may transmit downlink grant 505 to UE 115 over a PDCCH. Downlink grant 505 may include a downlink grant of resources on PDSCH 510 for a downlink data transmission. In such examples, UE 115 may transmit acknowledgement feedback messages (e.g., ACK or NACK messages) over PUCCH 515 indicating whether UE 115 has received the downlink data transmission over PDSCH 510. Base station 105 may also transmit one or more uplink grants 520 over PDCCHs. For example, uplink grant 520-a may include a grant of resources on PUSCH 525-a for a first uplink data transmission, and uplink grant 520-b may include a grant of resources for an uplink data transmission over PUSCH 525-b.

In some examples, PUCCH 515 may be located on a first CC (e.g., primary CC (PCC) 530) and PUSCHs 525 may be located on a second CC (secondary CC (SCC) 535). PCC 530 may be a 15 kHz CC and SCC 535 may be a 30 kHz CC.

A standard UE 115 may be able to perform a cross-CC UCI multiplexing procedure according to a set of multiplexing rules. For example, a standard UE 115 may multiplex overlapping PUCCH transmissions into a same resource (e.g., resource Z) per PUCCH slot according to the numerology of a PUCCH CC (e.g., PCC 530). For UCI that does not include a scheduling request in resource Z, standard UE 115 may multiplex the UCI in resource Z onto a PUSCH 525 that at least partially overlaps with the PUCCH according to the following priority rules. Standard UE 115 may prioritize multiplexing UCI with a PUSCH including aperiodic channel state information (A-CSI) as long as the A-CSI overlaps with resource Z. As a second priority, standard UE 115 may multiplex the UCI with an earliest PUSCH slot based on the start of the earliest slot (e.g., PUSCH 525-a over PUSCH 525-b). If one or more PUSCHs 525 overlap with resource Z in the earliest PUSCH slot, then standard UE 115 may prioritize dynamic grant PUSCHs 525 over PUSCHs configured by respective higher layer signaling, semi periodic scheduling, or periodic messages (e.g., ConfiguredGrant-Config or semiPersistentOnPUSCH). Then, standard UE 115 may prioritize PUSCHs on serving cells with smaller CC serving cell indices over PUSCHs on CC serving cells with largest serving cell indices. Finally, standard UE 115 may prioritize earlier PUSCH transmissions over later PUSCH transmissions. At least some of such prioritization rules may be applicable where numerologies of PCC 530 and SCC 535 are the same, or different. Performing such cross-CC UCI multiplexing may result in power consumption that exceeds the capacity of a reduced capability UE 115.

In some examples, a reduced capability UE 115 may determine whether overlapping PUCCH 515 and PUSCHs 525 are located on the same CC. If the overlapping PUCCH 515 and PUSCHs 525 are located on the same CC, then reduced capability UE 115 may perform a UCI multiplexing procedure, as shown in greater detail with reference to FIG. 6. For instance, reduced capability UE 115 may perform a UCI multiplexing procedure as described with reference to FIG. 4. If the overlapping PUCCH 515 and PUSCHs 525 are not located on the same CC (e.g., if PUCCH 515 is located on PCC 530 and PUSCH 525-a and PUSCH 525-b are located on SCC 535), then reduced capability UE 115 may transmit the acknowledgement feedback message on PUCCH 515 over PCC 530, and may simultaneously transmit uplink data transmissions on PUSCH 525-a or PUSCH 525-b over SCC 535. By refraining from performing cross-CC UCI multiplexing, the reduced capability UE 115 may conserve power, resulting in extended battery life and improved user experience.

Figure 6:
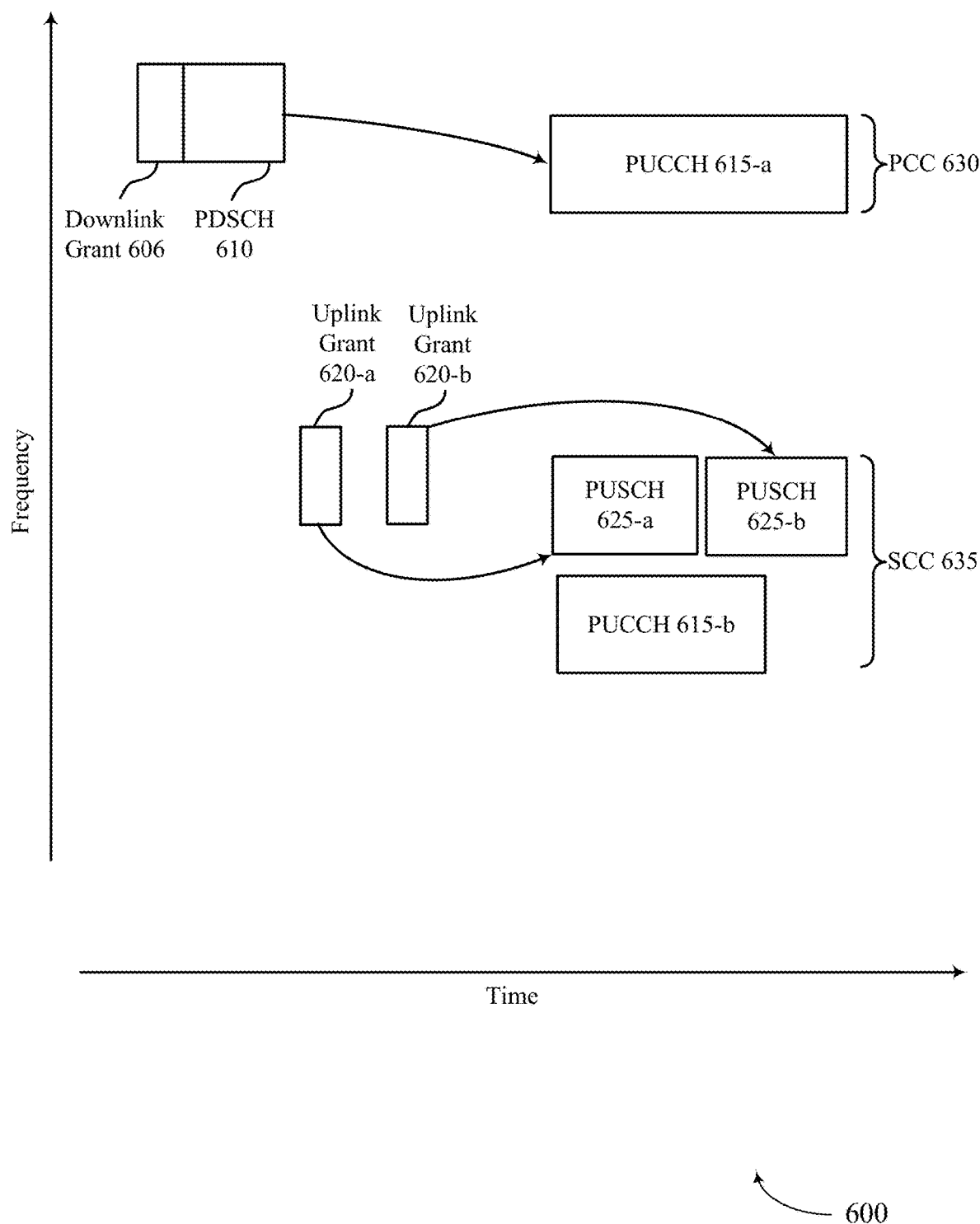
FIG. 6 illustrates an example of a multiplexing scheme that supports UCI multiplexing rule simplification for reduced capability UEs in accordance with aspects of the present disclosure.

FIG. 6 illustrates an example of a multiplexing scheme 600 that supports UCI multiplexing rule simplification for reduced capability UEs in accordance with aspects of the present disclosure. In some examples, multiplexing scheme 600 may implement aspects of wireless communications systems 100 and 200.

In some examples, a base station 105 may communicate with a UE 115 (e.g., a standard capability UE 115 or a reduced capability UE 115). For instance, base station 105 may transmit downlink grant 605 to UE 115 over a PDCCH. Downlink grant 605 may include a downlink grant of resources on PDSCH 610 for a downlink data transmission. In such examples, UE 115 may transmit acknowledgement feedback messages (e.g., ACK or NACK messages) over PUCCH 615-a indicating whether UE 115 has received the downlink data transmission over PDSCH 610. Base station 105 may also transmit one or more uplink grants 620 over PDCCHs. For example, uplink grant 620-a may include a grant of resources on PUSCH 625-a for a first uplink data transmission, and uplink grant 620-b may include a grant of resources for an uplink data transmission over PUSCH 625-b.

In some examples, PUCCH 615-a may be located on a first CC (e.g., PCC 630) and PUSCHs 625 may be located on a second CC (SCC 635). PCC 630 may be a 15 kHz CC (a CC using a 15 kHz subcarrier spacing) and SCC 635 may be a 30 kHz CC (a CC using a 30 kHz subcarrier spacing).

A standard UE 115 may be able to perform a cross-CC UCI multiplexing procedure according to a set of multiplexing rules. For example, a standard UE 115 may multiplex overlapping PUCCH transmissions into a same resource (e.g., resource Z) per PUCCH slot according to the numerology of a PUCCH CC (e.g., PCC 630). For UCI that does not include a scheduling request in resource Z, standard UE 115 may multiplex the UCI in resource Z onto a PUSCH 625 that at least partially overlaps with the PUCCH according to the following priority rules. Standard UE 115 may prioritize multiplexing UCI with a PUSCH including aperiodic channel state information (A-CSI) as long as the A-CSI overlaps with resource Z. As a second priority, standard UE 115 may multiplex the UCI with an earliest PUSCH slot based on the start of the earliest slot (e.g., PUSCH 625-a over PUSCH 625-b). If one or more PUSCHs 625 overlap with resource Z in the earliest PUSCH slot, then standard UE 115 may prioritize dynamic grant PUSCHs 625 over PUSCHs configured by respective higher layer signaling, semi periodic scheduling, or periodic messages (e.g., ConfiguredGrant-Config or semiPersistentOnPUSCH). Then, standard UE 115 may prioritize PUSCHs on serving cells with smaller CC serving cell indices over PUSCHs on CC serving cells with largest serving cell indices. Finally, standard UE 115 may prioritize earlier PUSCH transmissions over later PUSCH transmissions. At least some of such prioritization rules may be applicable where numerologies of PCC 630 and SCC 635 are the same, or different. Performing such cross-CC UCI multiplexing may result in power consumption that exceeds the capability of a reduced capability UE 115.

In some examples, a reduced capability UE 115 may identify overlapping PUCCHs and PUSCHs on the same CC. In such examples, reduced capability UE 115 may multiplex UCI and uplink data on the PUSCH, and drop the PUCCH. For example, PUCCH 615-b may be located on the same CC (e.g., SCC 635) as one or more PUSCH 625. In such examples, reduced capability UE 115 may multiplex UCI and uplink data and transmit the multiplexed UCI and uplink data on a PUSCH 625. Reduced capability UE 115 may thus drop PUCCH 615-b.

However, if a PUCCH 615 and one or more PUSCHs 625 are on different CCs, then reduced capability UE 115 may refrain from performing UCI multiplexing. For example, PUCCH 615-a may be located on PCC 630 and one or more PUSCHs 625 may be located on SCC 635. In such cases, reduced capability UE 115 may transmit UCI including an acknowledgement feedback message for PDSCH 610 on PUCCH 615-a over PCC 630, and may simultaneously transmit uplink data transmissions on PUSCH 625-a or PUSCH 625-b over SCC 635. By refraining from performing cross-CC UCI multiplexing, the reduced capability UE 115 may conserve power, resulting in extended battery life and improved user experience.

Figure 7:
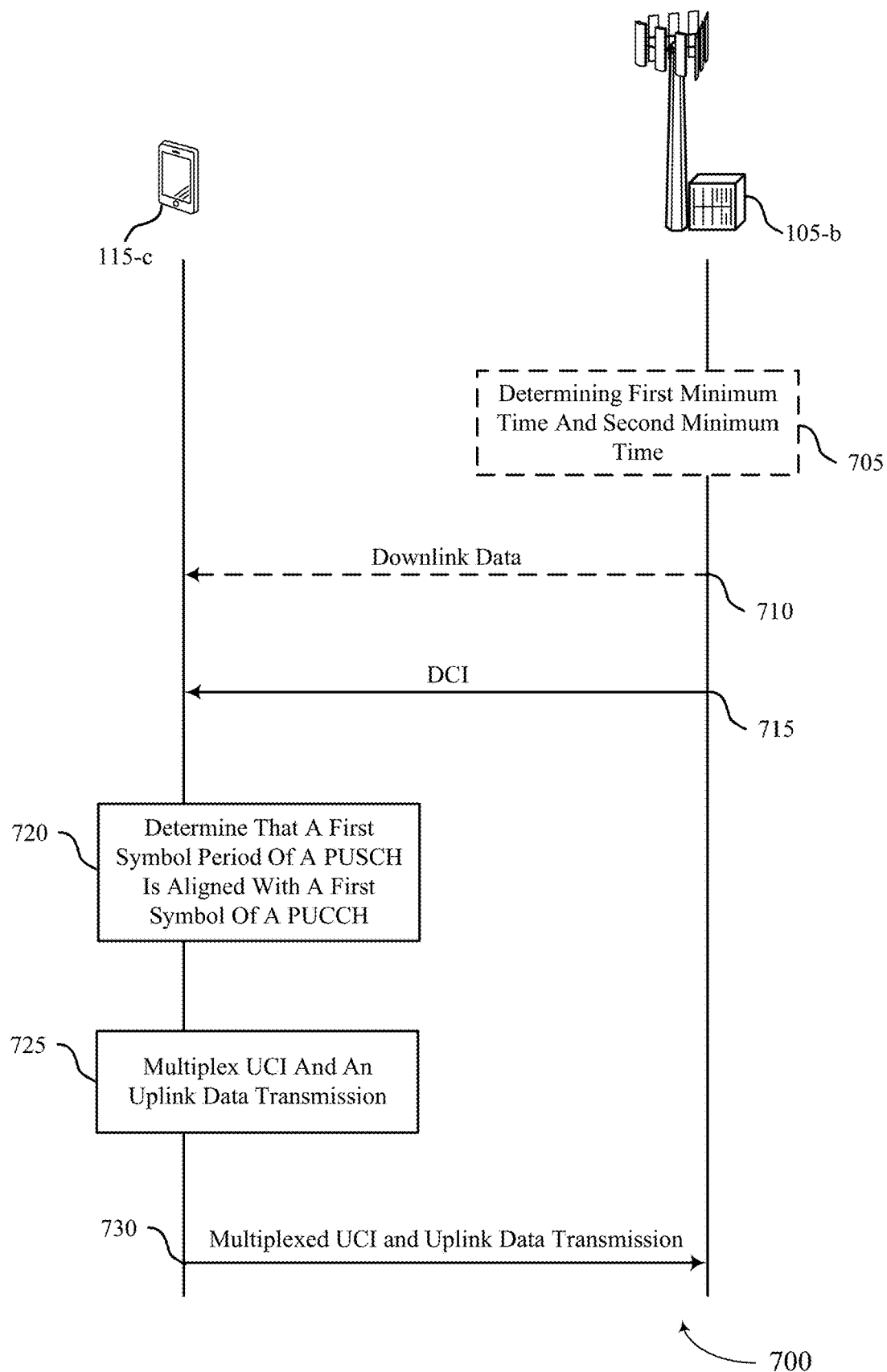
FIG. 7 illustrates an example of a process flow that supports UCI multiplexing rule simplification for reduced capability UEs in accordance with aspects of the present disclosure.

FIG. 7 illustrates an example of a process flow 700 that supports UCI multiplexing rule simplification for reduced capability UEs in accordance with aspects of the present disclosure. In some examples, process flow 700 may implement aspects of wireless communications systems 100 and 200. Process flow 700 may include a UE 115-c and a base station 105-b, which may be examples of corresponding devices described with reference to FIG. 1 and FIG. 2.

In some examples, at 710, base station 105-b may send a downlink data transmission to UE 115-c. Base station 105-b may transmit the downlink data over a downlink shared channel (e.g., a PDSCH).

At 715, base station 105-b may transmit a downlink control information (DCI) message to UE 115-c. The DCI may include a grant of resources for an uplink data transmission on an uplink shared channel (e.g., a PUSCH).

At 720, UE 115-c may determine that a first symbol period of the PUSCH is aligned with a first symbol period of a PUCCH for UCI. UE 115-c may determine that the first symbol period of the PUSCH is within a threshold amount of time or a threshold number of TTIs from the first symbol period of the PUCCH.

The UCI may include CSI (e.g., a CSI report, a P-CSI report, a SP-CSI report), acknowledgement feedback (ACK or NACK signaling), SRs, or a combination thereof (e.g., HARQ-ACK+SR on PUCCH, HARQ-ACK+SR+CSI on PUCCH, or the like). In some examples, the UCI may include acknowledgement feedback for a received downlink transmission. For instance, the UCI may include an ACK message or NACK message corresponding to the downlink data received at 710.

At 725, UE 115-c may multiplex UCI and the uplink data transmission for simultaneous transmission on the PUSCH. UE 115-c may multiplex the UCI and the uplink data transmission based on determining that the first symbol period of the PUSCH is aligned with the first symbol period of the PUCCH.

Multiplexing the UCI and the uplink data transmission may include multiplexing a payload of the PUCCH (e.g., the UCI) with a payload of the PDSCH (e.g., the uplink data transmission), and transmitting the multiplexed payload. UE 115-c may drop the PUCCH.

In some examples, UE 115-a may determine that that a first time between receiving the downlink data transmission at 710 and transmitting the acknowledgement feedback and the uplink data transmission at 730 satisfies a first threshold time, and may determine that a second time between receiving the DCI at 715 and transmitting the acknowledgement feedback and the uplink data transmission at 730 satisfies a second threshold time, where multiplexing the acknowledgement feedback and the uplink data transmission is based on the first time satisfying the first threshold time and the second time satisfying the second threshold time. In such examples, UE 115-c many multiplex the UCI and the uplink data at 725 based on the two times being satisfied. In some examples, UE 115-c may assume that the times are satisfied, and may not waste computational resources or time making the determination autonomously. For instance, base station 105-b may determine, at 705, the first time (e.g., a first minimum time for receiving a downlink grant for the downlink data at 715, receiving the downlink data transmission at 710, processing the downlink data, and multiplexing acknowledgement feedback for the downlink data with uplink data at 725) and a second time (e.g., a second minimum time for receiving the DCI, preparing the uplink data, and multiplexing the UCI with the uplink data), and may schedule the PUCCH for the UCI and the PUSCH to satisfy the first and second time. In such examples, base station 105-b may transmit a DCI including a downlink grant for the downlink data at 710, transmit the DCI at 715, and schedule the PUCCH, to satisfy the first time and the second time.

In some examples, UE 115-c may multiplex the UCI and the uplink data transmission based on UE type. For example, UE 112-c may identify that it is a first type of UE (e.g., a RedCap UE), and may multiplex the uplink data transmission and UCI based on the PUCCH and PDSCH being aligned, and based on its status as a RedCap UE. Other UE types (e.g., standard UEs), may perform more complex UCI multiplexing procedures (e.g., may perform complex time checks).

At 730, UE 115-c may transmit the UCI and uplink data transmission multiplexed on the PUSCH. Base station 105-b may receive and decode the multiplexed UCI and uplink data transmission. Base station 105-b may expect the multiplexed UCI and uplink data based on the type of UE (e.g., RedCap UE) for UE 115-c, and the alignment between the PUCCH and PUSCH. Thus, if base station 105-b schedules a PUCCH and a PUSCH that are aligned in time as determined by UE 115-c at 720, and if UE 115-c is a RedCap UE, and if base station 105-b has scheduled the PUCCH and PUSCH to satisfy the first time and the second time, as described herein, then base station 105-b may monitor for, receive, and decode, a multiplexed UCI and uplink data transmission. However, if any one of the above mentioned conditions are not satisfied, then base station 105-b may monitor for, receive, and decode only one overlapping channel (e.g., the overlapping channel with the highest priority).

In some examples, during a TTI that is different than the TTI in which the PUSCH and the PUCCH overlap, UE 115-c may determine that a first uplink channel at least partially overlaps with a second uplink channel, and may determine to drop one of the two uplink channels based on identifying that a first symbol period of the first uplink channel is misaligned with a first symbol period of the second uplink channel. UE 115-c may determine that the first uplink channel has a first priority level and that the second uplink channel has a second priority level that is lower priority than the first priority level, and may transmit an uplink message on the first uplink channel based on its higher priority level, and may drop the second uplink channel. UE 115-c may determine which of the two uplink channels has a higher priority level by identifying respective priority indicators for the two uplink channels, and comparing the priority indicators. UE 115-c may identify the priority indicators based on receiving DCIs associated with the two uplink channels (e.g., an uplink grant for an uplink transmission on one of the uplink channels, and a downlink grant for a downlink transmission, where UCI including acknowledgement feedback messages corresponding to the downlink transmission is to be transmitted on the other uplink channel). In some examples, UE 115-*c* may determine that the first uplink channel has a higher priority level than the second uplink channel based on timing. UE 115-*c* may determine that the first symbol period of the first uplink channel is first in time. In such examples, determining that the first uplink channel has the first priority level and that the second uplink channel has the second priority level that is lower priority than the first priority level is based on determining that the first symbol period of the first uplink channel is first in time. The first uplink channel may be a PUCCH and the second uplink channel may be a PUSCH, or the first uplink channel may be a PUSCH and the second uplink channel may be a PUCCH.

Figure 8:
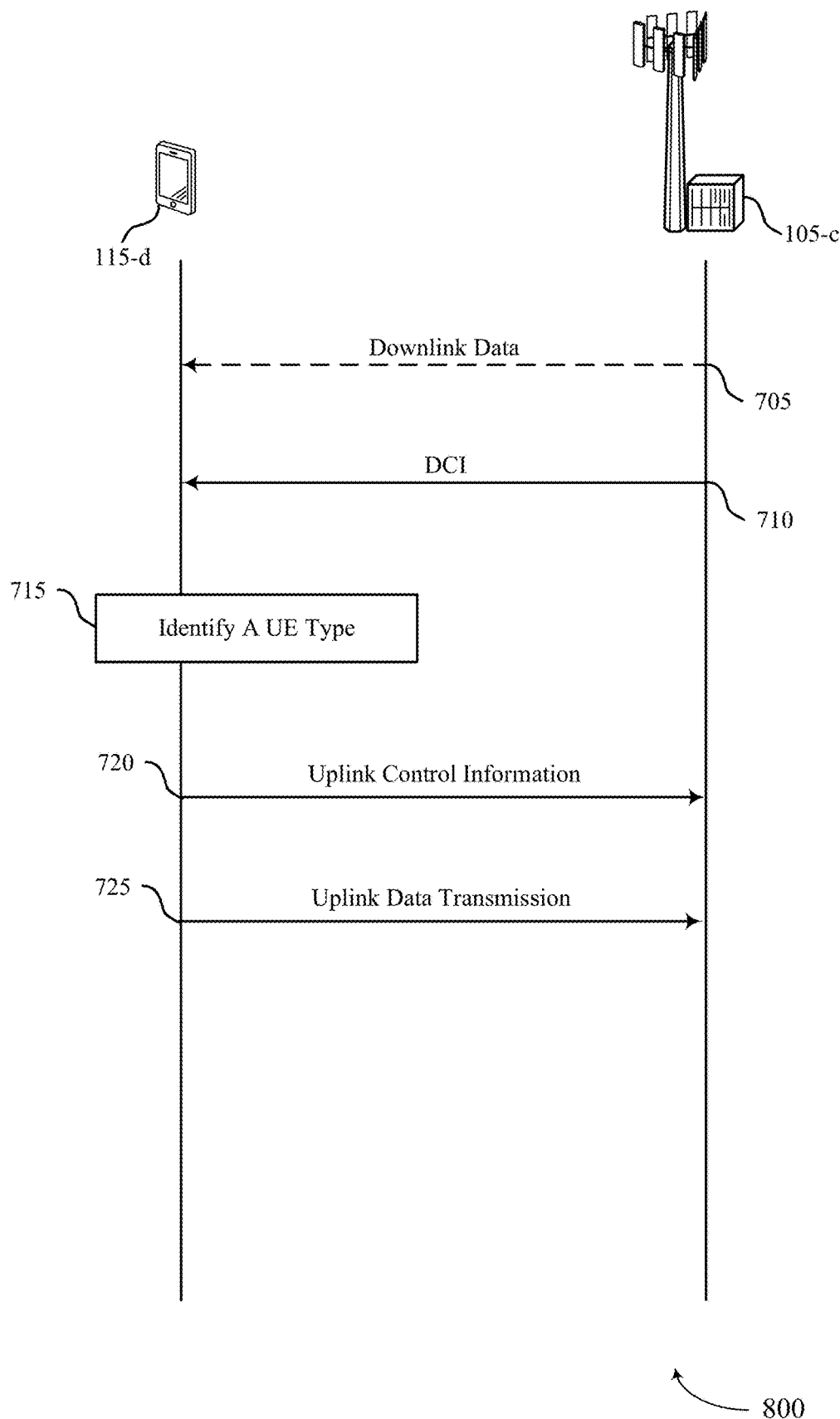
FIG. 8 illustrates an example of a process flow that supports UCI multiplexing rule simplification for reduced capability UEs in accordance with aspects of the present disclosure.

FIG. 8 illustrates an example of a process flow 800 that supports UCI multiplexing rule simplification for reduced capability UEs in accordance with aspects of the present disclosure. In some examples, process flow 800 may implement aspects of wireless communications system 100. Process flow 800 may include a UE 115-*d* and a base station 105-*c*, which may be examples of corresponding devices described with reference to FIG. 1 and FIG. 2.

At 805, base station 105-*c* may transmit downlink data to UE 115-*d* on a PDSCH.

At 810, base station 105-*c* may transmit a DCI. The DCI may indicate a grant of resources for an uplink data transmission on an uplink shared channel (e.g., a PDSCH) of a second CC, the PDSCH at least partially overlapping with an uplink control channel for UCI on a first CC.

At 815, UE 115-*d* may identify that it is a first type of UE (e.g., a RedCap UE). RedCap UEs may be associated with a first multiplexing procedure performed at 820 and 825, while other UEs 115 (e.g., standard UEs) may be associated with another multiplex procedure including multiplexing UCI and uplink data transmission.

At 820, based on its status as a UE RedCap and the overlap between the PUSCH and the PUCCH on different CCs, UE 115-*d* may transmit the UCI on the first CC, and at 825 UE 115-*d* may transmit the uplink data transmission on the second CC. That is, UE 115 may refrain from multiplexing the UCI and the uplink data on the first CC, the second CC, or both, based on being a RedCap UE.

If a second PUCCH overlaps with the uplink data transmission on the second CC, then UE 115-*a* may multiplex the second UCI and the uplink data transmission at 825 on the second CC.

At another point in time, if a PUSCH and a PUCCH overlap on the same CC, then UE 115-*d* may multiplex UCI and data. For instance, if a PUCCH and a PUSCH overlap on the first CC at another instance in time, then UE 115-*d* may multiplex UCI and uplink data on the first CC.

Figure 9:
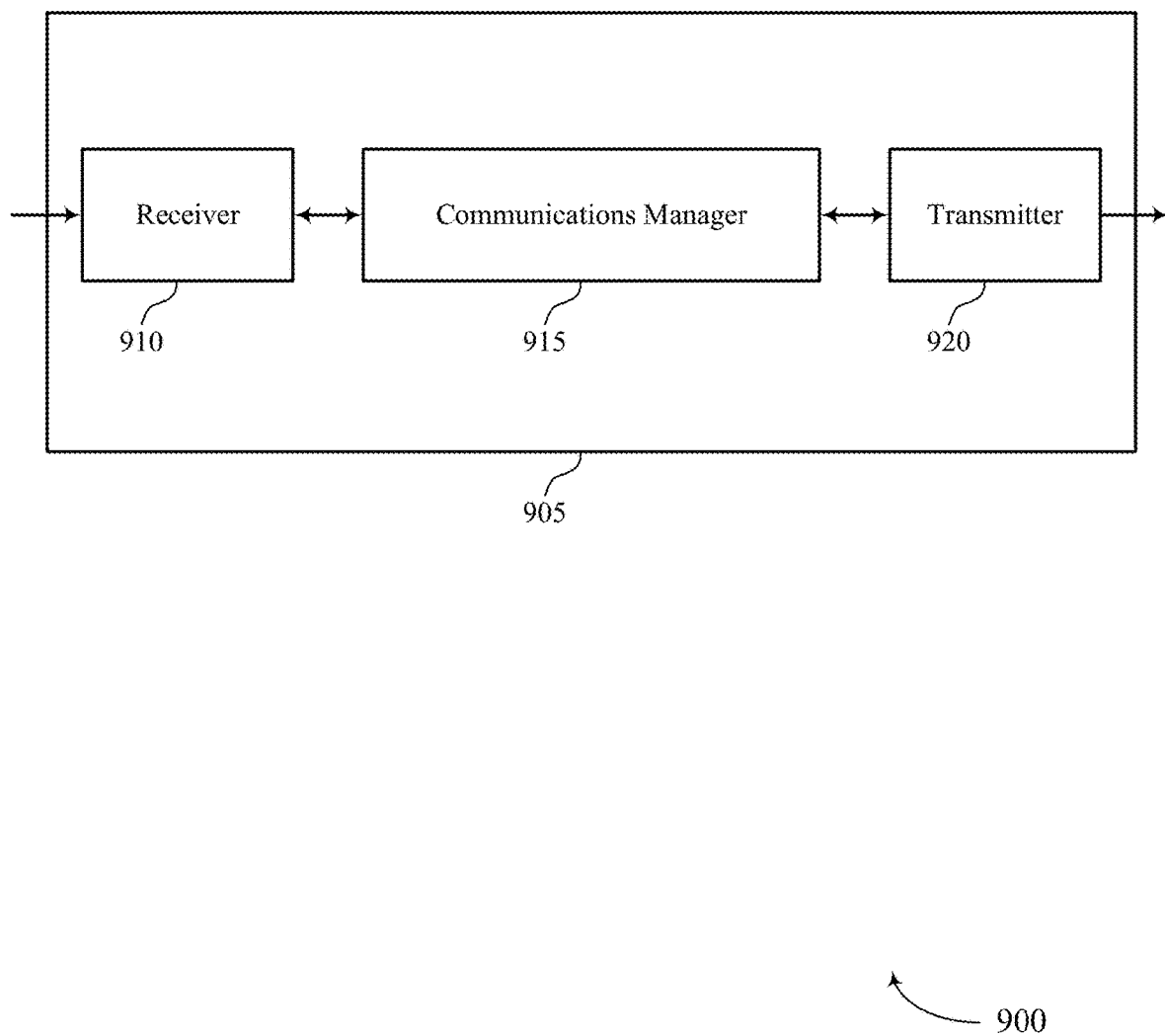
FIGS. 9 and 10 show block diagrams of devices that support UCI multiplexing rule simplification for reduced capability UEs in accordance with aspects of the present disclosure.

FIG. 9 shows a block diagram 900 of a device 905 that supports UCI multiplexing rule simplification for reduced capability UEs in accordance with aspects of the present disclosure. The device 905 may be an example of aspects of a UE 115 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform the multiplexing rule features discussed herein. Each of these components may be in communication with one another (e.g., via one or more buses).

The receiver 910 may receive information such as packets, user data, or control information associated with various information channels (e.g., control channels, data channels, and information related to UCI multiplexing rule simplification for reduced capability UEs). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a downlink control message indicating a grant of resources for an uplink data transmission on an uplink shared channel, determine that a first symbol period of the uplink shared channel is aligned with a first symbol period of an uplink control channel for UCI, multiplex, based on determining that the first symbol period of the uplink shared channel is aligned with the first symbol period of the uplink control channel, the UCI and the uplink data transmission on the uplink shared channel, and transmit the UCI and the uplink data transmission multiplexed on the uplink shared channel. The communications manager 915 may also receive a downlink control message indicating a grant of resources for an uplink data transmission on an uplink shared channel of a second CC, the uplink shared channel at least partially overlapping with an uplink control channel for UCI on a first CC, identify that the UE is a first type of a set of UE types, where a second type of the set of UE types is associated with multiplexing UCI and uplink data transmissions across multiple CCs, and transmit, based on the UE being the first type, the UCI on the uplink control channel on the first CC and the uplink data transmission on the uplink shared channel on the second CC. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device to perform simplified UCI multiplexing procedures, resulting in decreased power expenditures, increased efficiency, extended battery life, decreased system congestion, improved system reliability, and increased user experience.

Figure 12:
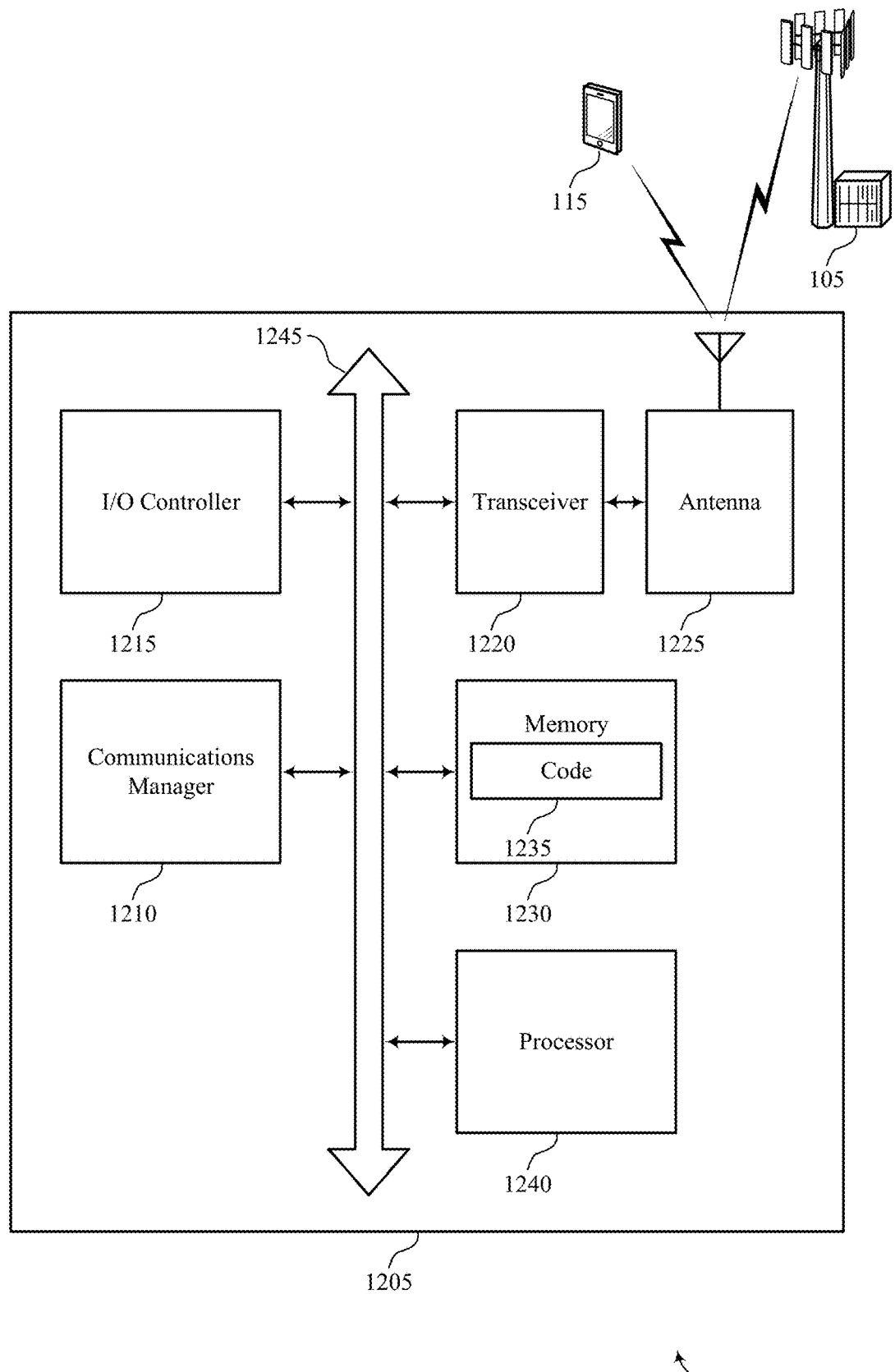
FIG. 12 shows a diagram of a system including a device that supports UCI multiplexing rule simplification for reduced capability UEs in accordance with aspects of the present disclosure.

Based on techniques for efficiently communicating maximum number of layers for a device as described herein, a processor of a UE 115 (e.g., controlling the receiver 910, the transmitter 920, or a transceiver 1220 as described with respect to FIG. 12) may increase system efficiency and decrease unnecessary processing at a device.

Figure 10:
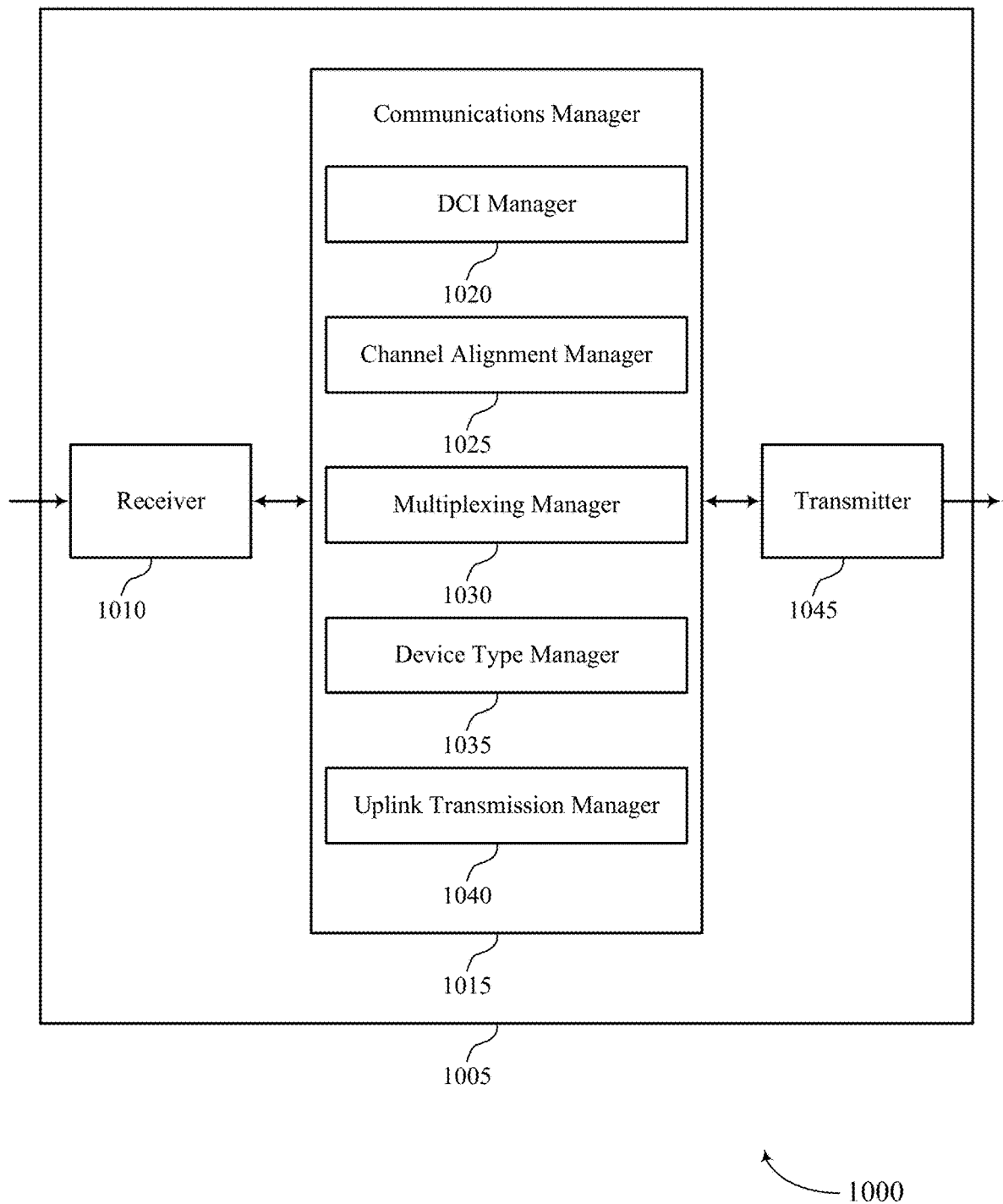

FIG. 10 shows a block diagram 1000 of a device 1005 that supports UCI multiplexing rule simplification for reduced capability UEs in accordance with aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to UCI multiplexing rule simplification for reduced capability UEs). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DCI manager 1020, a channel alignment manager 1025, a multiplexing manager 1030, a device type manager 1035, and an uplink transmission manager 1040. The communications manager 1015 may be an example of aspects of the communications manager 1210 described herein.

The DCI manager 1020 may receive a downlink control message indicating a grant of resources for an uplink data transmission on an uplink shared channel.

The channel alignment manager 1025 may determine that a first symbol period of the uplink shared channel is aligned with a first symbol period of an uplink control channel for UCI.

The multiplexing manager 1030 may multiplex, based on determining that the first symbol period of the uplink shared channel is aligned with the first symbol period of the uplink control channel, the UCI and the uplink data transmission on the uplink shared channel and transmit the UCI and the uplink data transmission multiplexed on the uplink shared channel.

The DCI manager 1020 may receive a downlink control message indicating a grant of resources for an uplink data transmission on an uplink shared channel of a second CC, the uplink shared channel at least partially overlapping with an uplink control channel for UCI on a first CC.

The device type manager 1035 may identify that the UE is a first type of a set of UE types, where a second type of the set of UE types is associated with multiplexing UCI and uplink data transmissions across multiple CCs.

The uplink transmission manager 1040 may transmit, based on the UE being the first type, the UCI on the uplink control channel on the first CC and the uplink data transmission on the uplink shared channel on the second CC.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

In some cases, the DCI manager 1020, the channel alignment manager 1025, the multiplexing manager 1030, the device type manager 1035, and the uplink transmission manager 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI manager 1020, the channel alignment manager 1025, the multiplexing manager 1030, the device type manager 1035, and the uplink transmission manager 1040 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
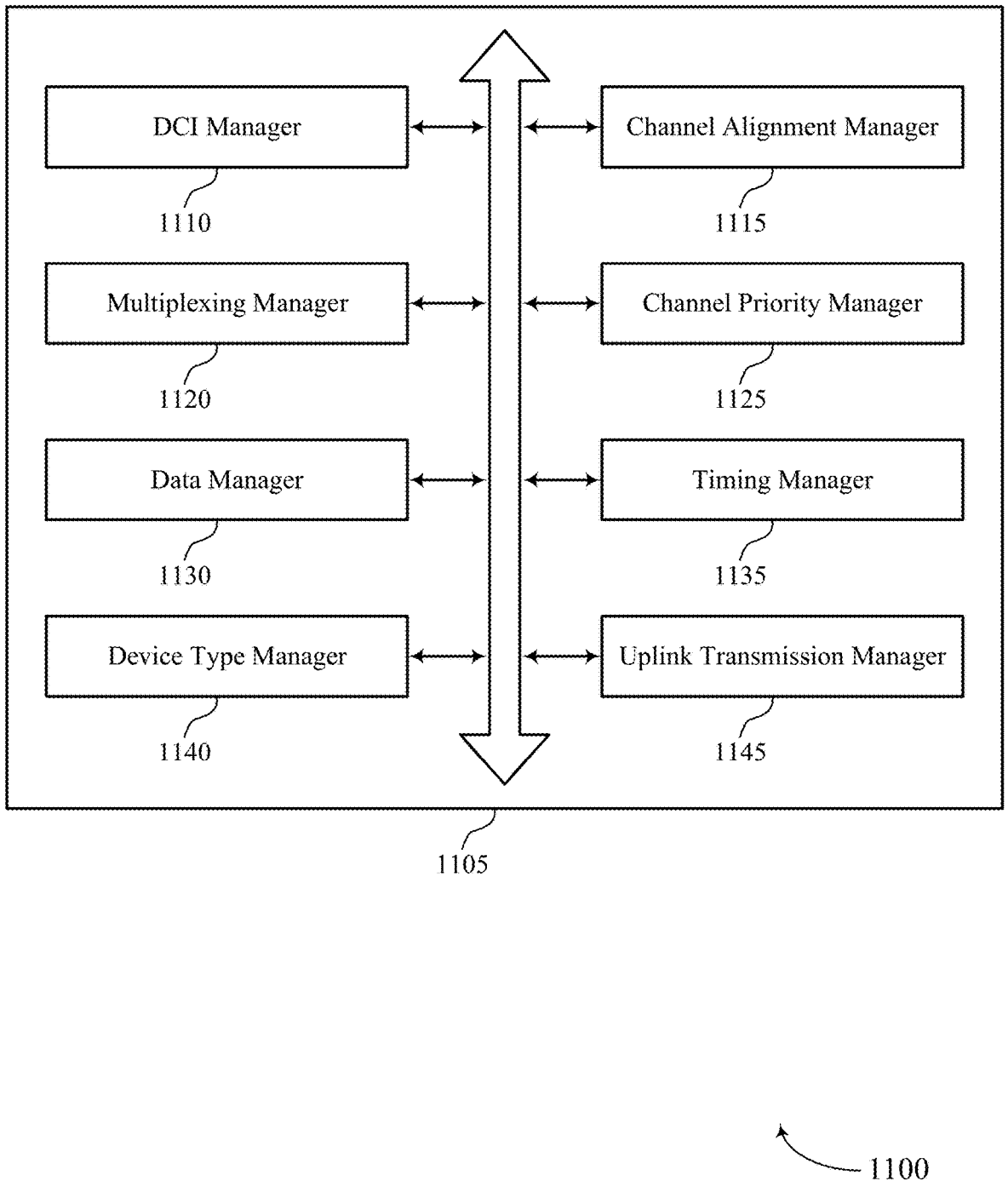
FIG. 11 shows a block diagram of a communications manager that supports UCI multiplexing rule simplification for reduced capability UEs in accordance with aspects of the present disclosure.

FIG. 11 shows a block diagram 1100 of a communications manager 1105 that supports UCI multiplexing rule simplification for reduced capability UEs in accordance with aspects of the present disclosure. The communications manager 1105 may be an example of aspects of a communications manager 915, a communications manager 1015, or a communications manager 1210 described herein. The communications manager 1105 may include a DCI manager 1110, a channel alignment manager 1115, a multiplexing manager 1120, a channel priority manager 1125, a data manager 1130, a timing manager 1135, a device type manager 1140, and an uplink transmission manager 1145. Each of these modules may communicate, directly or indirectly, with one another (e.g., via one or more buses).

The DCI manager 1110 may receive a downlink control message indicating a grant of resources for an uplink data transmission on an uplink shared channel. In some examples, the DCI manager 1110 may receive a downlink control message indicating a grant of resources for an uplink data transmission on an uplink shared channel of a second CC, the uplink shared channel at least partially overlapping with an uplink control channel for UCI on a first CC. In some examples, the DCI manager 1110 may receive a second downlink control message indicating a grant of resources for a second uplink data transmission on a second uplink shared channel of the first CC, the second uplink data transmission at least partially overlapping with a second uplink control channel for second UCI.

The channel alignment manager 1115 may determine that a first symbol period of the uplink shared channel is aligned with a first symbol period of an uplink control channel for UCI. In some examples, the channel alignment manager 1115 may determine, during a second transmission time interval, that a first uplink channel at least partially overlaps with a second uplink channel. In some examples, the channel alignment manager 1115 may determine that a time between the first symbol period of the uplink shared channel and the first symbol period of the uplink control channel satisfies a threshold time. In some cases, the UCI includes channel state information, or a scheduling request, or acknowledgement feedback, or a combination thereof.

The multiplexing manager 1120 may multiplex, based on determining that the first symbol period of the uplink shared channel is aligned with the first symbol period of the uplink control channel, the UCI and the uplink data transmission on the uplink shared channel. In some examples, the multiplexing manager 1120 may transmit the UCI and the uplink data transmission multiplexed on the uplink shared channel. In some examples, multiplexing a payload of the uplink control channel with a payload of the uplink shared channel to generate a multiplexed payload, where transmitting both the UCI and the uplink data transmission includes transmitting the multiplexed payload. In some examples, the multiplexing manager 1120 may drop the uplink control channel. In some examples, the multiplexing manager 1120 may multiplex the second UCI and the second uplink data transmission on the first CC.

The device type manager 1140 may identify that the UE is a first type of a set of UE types, where a second type of the set of UE types is associated with multiplexing UCI and uplink data transmissions across multiple CCs. In some examples, identifying that the UE is a first type of a set of UE types, the first type of UE of the set of UE types configured to perform a first UCI multiplexing procedure based on determining that the first symbol period of the uplink shared channel is aligned with the first symbol period of the uplink control channel, and a second type of UE of the set of UEs configured to perform a second UCI multiplexing procedure based on determining that the first symbol period of the uplink shared channel is aligned with the first symbol period of the uplink control channel, where the first UCI multiplexing procedure includes multiplexing the UCI and the uplink data transmission on the uplink shared channel.

In some cases, the first type of UE of the set of UE types is associated with a first capability level and a second type of UE of the set of UE types is associated with a second capability level. In some cases, the first type of UE of the set of UE types is configured to perform a first UCI multiplexing procedure including transmitting the uplink control channel on the first CC and the uplink data transmission on the uplink shared channel on the second CC, and where a second type of UE of the set of UEs configured to perform a UCI multiplexing second procedure.

The uplink transmission manager 1145 may transmit, based on the UE being the first type, the UCI on the uplink control channel on the first CC and the uplink data transmission on the uplink shared channel on the second CC. In some examples, the uplink transmission manager 1145 may refrain, based on the UE being the first type, from multiplexing the UCI and the uplink data transmission on the first CC; or, in some examples, the uplink transmission manager 1145 may refrain, based on the UE being the first type, from multiplexing the UCI and the uplink data transmission on the second CC; or both.

In some examples, the uplink transmission manager 1145 may transmit, based on the UE being the first type, both the second UCI and the second uplink data transmission over the second uplink shared channel on the first CC. In some examples, the uplink transmission manager 1145 may transmit, based on the UE being the first type, both the second UCI and the uplink data transmission on the uplink shared channel on the second CC. In some cases, the UCI includes channel state information, or a scheduling request, or acknowledgement feedback, or a combination thereof.

The channel priority manager 1125 may determine to drop one of the first uplink channel or the second uplink channel based on identifying that a first symbol period of the first uplink channel is misaligned with a first symbol period of the second uplink channel. In some examples, the channel priority manager 1125 may determine that the first uplink channel has a first priority level and that the second uplink channel has a second priority level that is lower priority than the first priority level. In some examples, the channel priority manager 1125 may transmit an uplink message on the first uplink channel based on the second priority level being the lower priority than the first priority level.

In some examples, the channel priority manager 1125 may drop the second uplink channel based on the second priority level being the lower priority than the first priority level. In some examples, the channel priority manager 1125 may identify a first priority indicator for the first uplink channel and a second priority indicator for the second uplink channel. In some examples, the channel priority manager 1125 may compare the first priority indicator and the second priority indicator, where determining that the first uplink channel has the first priority level and that the second uplink channel has the second priority level that is lower priority than the first priority level is based on comparing the first priority indicator and the second priority indicator.

In some examples, the channel priority manager 1125 may determine that the first symbol period of the first uplink channel is first in time, where determining that the first uplink channel has the first priority level and that the second uplink channel has the second priority level that is lower priority than the first priority level is based on determining that the first symbol period of the first uplink channel is first in time. In some cases, the first uplink channel includes a second uplink control channel and the second uplink channel includes a third uplink control channel. In some cases, the first uplink channel includes a second uplink shared channel and the second uplink channel includes a second uplink control channel.

The data manager 1130 may receive a downlink data transmission on a downlink shared channel, where the UCI includes acknowledgement feedback corresponding to the data transmission on the downlink shared channel.

The timing manager 1135 may determine that a first time between receiving the downlink data transmission and transmitting the acknowledgement feedback and the uplink data transmission satisfies a first threshold time. In some examples, the timing manager 1135 may determine that a second time between receiving the downlink control message and transmitting the acknowledgement feedback and the uplink data transmission satisfies a second threshold time, where multiplexing the acknowledgement feedback and the uplink data transmission is based on the first time satisfying the first threshold time and the second time satisfying the second threshold time.

In some cases, the DCI manager 1110, the channel alignment manager 1115, the multiplexing manager, the channel priority manager 1125, the data manager 1130, the timing manager, the device type manager, and the uplink transmission manager 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI manager 1110, the channel alignment manager 1115, the multiplexing manager, the channel priority manager 1125, the data manager 1130, the timing manager, the device type manager, and the uplink transmission manager 1145 discussed herein FIG. 12 shows a diagram of a system 1200 including a device 1205 that supports UCI multiplexing rule simplification for reduced capability UEs in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a downlink control message indicating a grant of resources for an uplink data transmission on an uplink shared channel, determine that a first symbol period of the uplink shared channel is aligned with a first symbol period of an uplink control channel for UCI, multiplex, based on determining that the first symbol period of the uplink shared channel is aligned with the first symbol period of the uplink control channel, the UCI and the uplink data transmission on the uplink shared channel, and transmit the UCI and the uplink data transmission multiplexed on the uplink shared channel. The communications manager 1210 may also receive a downlink control message indicating a grant of resources for an uplink data transmission on an uplink shared channel of a second CC, the uplink shared channel at least partially overlapping with an uplink control channel for UCI on a first CC, identify that the UE is a first type of a set of UE types, where a second type of the set of UE types is associated with multiplexing UCI and uplink data transmissions across multiple CCs, and transmit, based on the UE being the first type, the UCI on the uplink control channel on the first CC and the uplink data transmission on the uplink shared channel on the second CC.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting UCI multiplexing rule simplification for reduced capability UEs).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
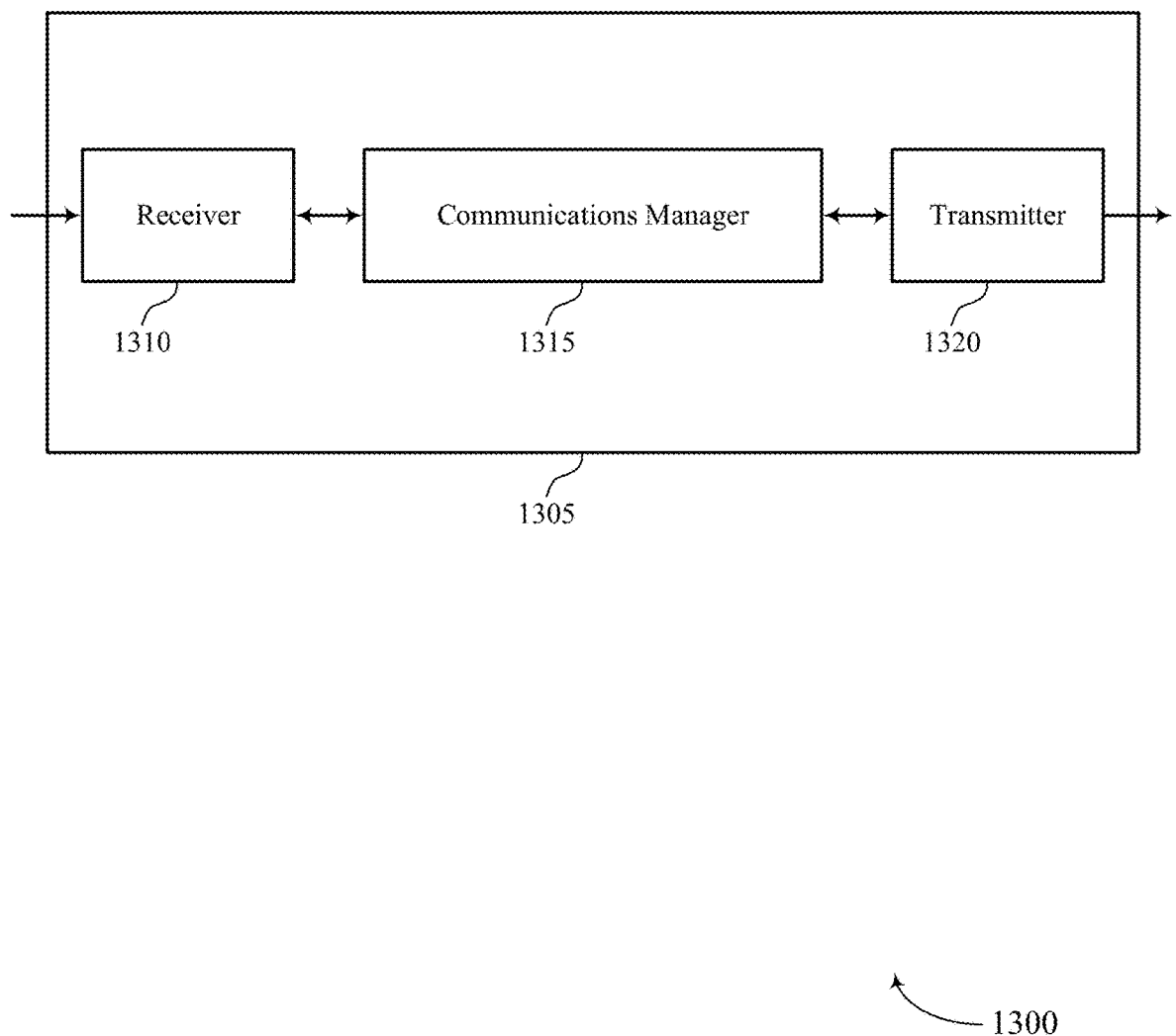
FIGS. 13 and 14 show block diagrams of devices that support UCI multiplexing rule simplification for reduced capability UEs in accordance with aspects of the present disclosure.

FIG. 13 shows a block diagram 1300 of a device 1305 that supports UCI multiplexing rule simplification for reduced capability UEs in accordance with aspects of the present disclosure. The device 1305 may be an example of aspects of a base station 105 as described herein. The device 1305 may include a receiver 1310, a communications manager 1315, and a transmitter 1320. The device 1305 may also include one or more processors, memory coupled with the one or more processors, and instructions stored in the memory that are executable by the one or more processors to enable the one or more processors to perform the multiplexing rule features discussed herein. Each of these components may be in communication with one another (e.g., via one or more buses).

The receiver 1310 may receive information such as packets, user data, or control information associated with various information channels (e.g., control channels, data channels, and information related to UCI multiplexing rule simplification for reduced capability UEs). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit a downlink control message indicating a grant of resources for an uplink data transmission on an uplink shared channel, determine that a first symbol period of the uplink shared channel is aligned with a first symbol period of an uplink control channel for UCI, and receive, based on determining that the first symbol period of the uplink shared channel is aligned with the first symbol period of the uplink control channel, the UCI and the uplink data transmission multiplexed on the uplink shared channel. The communications manager 1315 may also identify that a UE is a first type of a set of UE types, where a second type of the set of UE types is associated with multiplexing UCI and uplink data transmissions across multiple CCs, transmit, to the UE, a downlink control message indicating a grant of resources for an uplink data transmission on an uplink shared channel of a second CC, the uplink shared channel at least partially overlapping with an uplink control channel for UCI on a first CC, and receive, based on the UE being the first type, the UCI on the uplink control channel on the first CC and the uplink data transmission on the uplink shared channel of the second CC. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
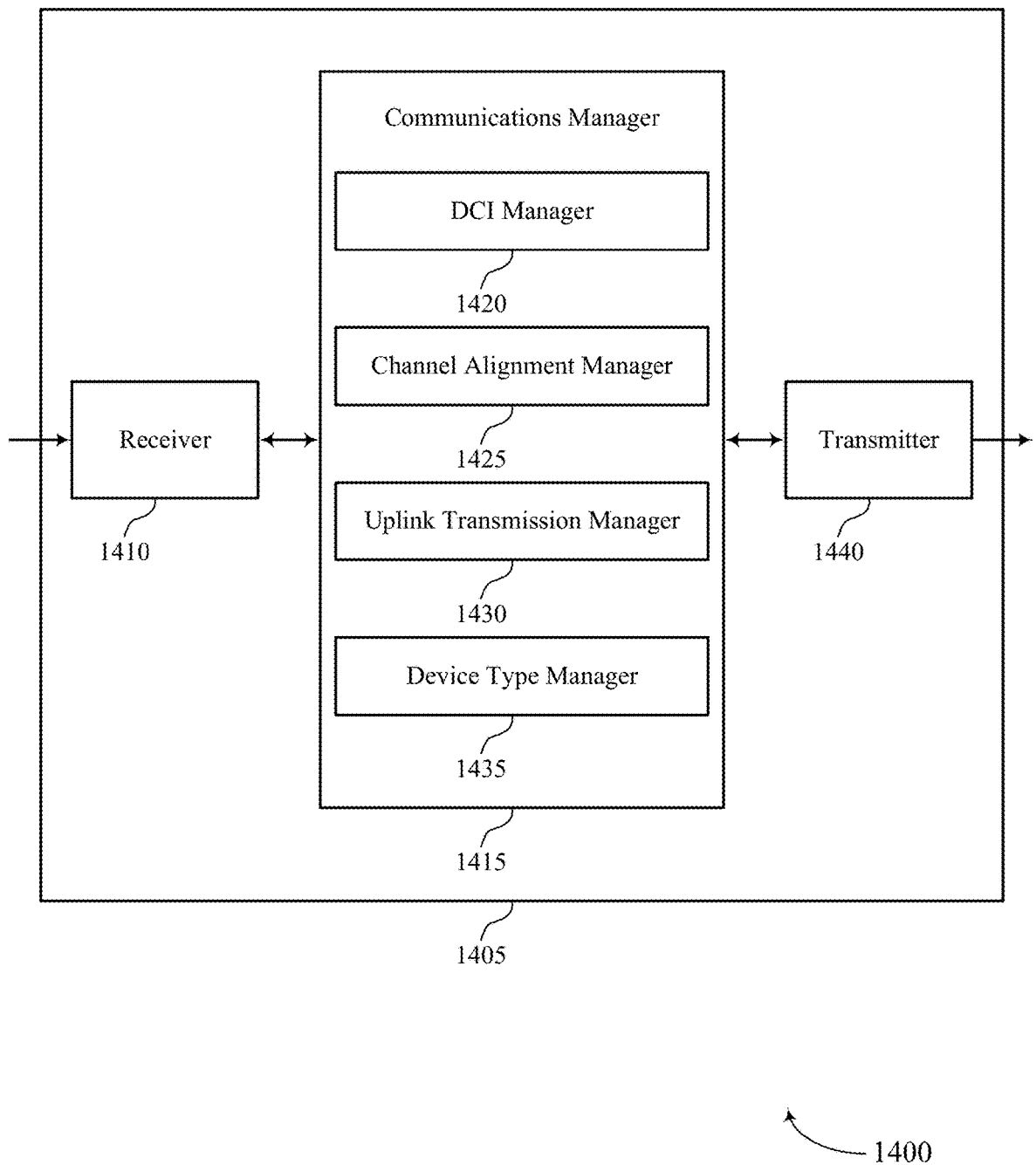

FIG. 14 shows a block diagram 1400 of a device 1405 that supports UCI multiplexing rule simplification for reduced capability UEs in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to UCI multiplexing rule simplification for reduced capability UEs). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a DCI manager 1420, a channel alignment manager 1425, an uplink transmission manager 1430, and a device type manager 1435. The communications manager 1415 may be an example of aspects of the communications manager 1610 described herein.

The DCI manager 1420 may transmit a downlink control message indicating a grant of resources for an uplink data transmission on an uplink shared channel.

The channel alignment manager 1425 may determine that a first symbol period of the uplink shared channel is aligned with a first symbol period of an uplink control channel for UCI.

The uplink transmission manager 1430 may receive, based on determining that the first symbol period of the uplink shared channel is aligned with the first symbol period of the uplink control channel, the UCI and the uplink data transmission multiplexed on the uplink shared channel.

The device type manager 1435 may identify that a UE is a first type of a set of UE types, where a second type of the set of UE types is associated with multiplexing UCI and uplink data transmissions across multiple CCs.

The DCI manager 1420 may transmit, to the UE, a downlink control message indicating a grant of resources for an uplink data transmission on an uplink shared channel of a second CC, the uplink shared channel at least partially overlapping with an uplink control channel for UCI on a first CC.

The uplink transmission manager 1430 may receive, based on the UE being the first type, the UCI on the uplink control channel on the first CC and the uplink data transmission on the uplink shared channel of the second CC.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

In some cases, the DCI manager 1420, the channel alignment manager 1425, the uplink transmission manager 1430, and the device type manager 1435 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI manager 1420, the channel alignment manager 1425, the uplink transmission manager 1430, and the device type manager 1435 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 15:
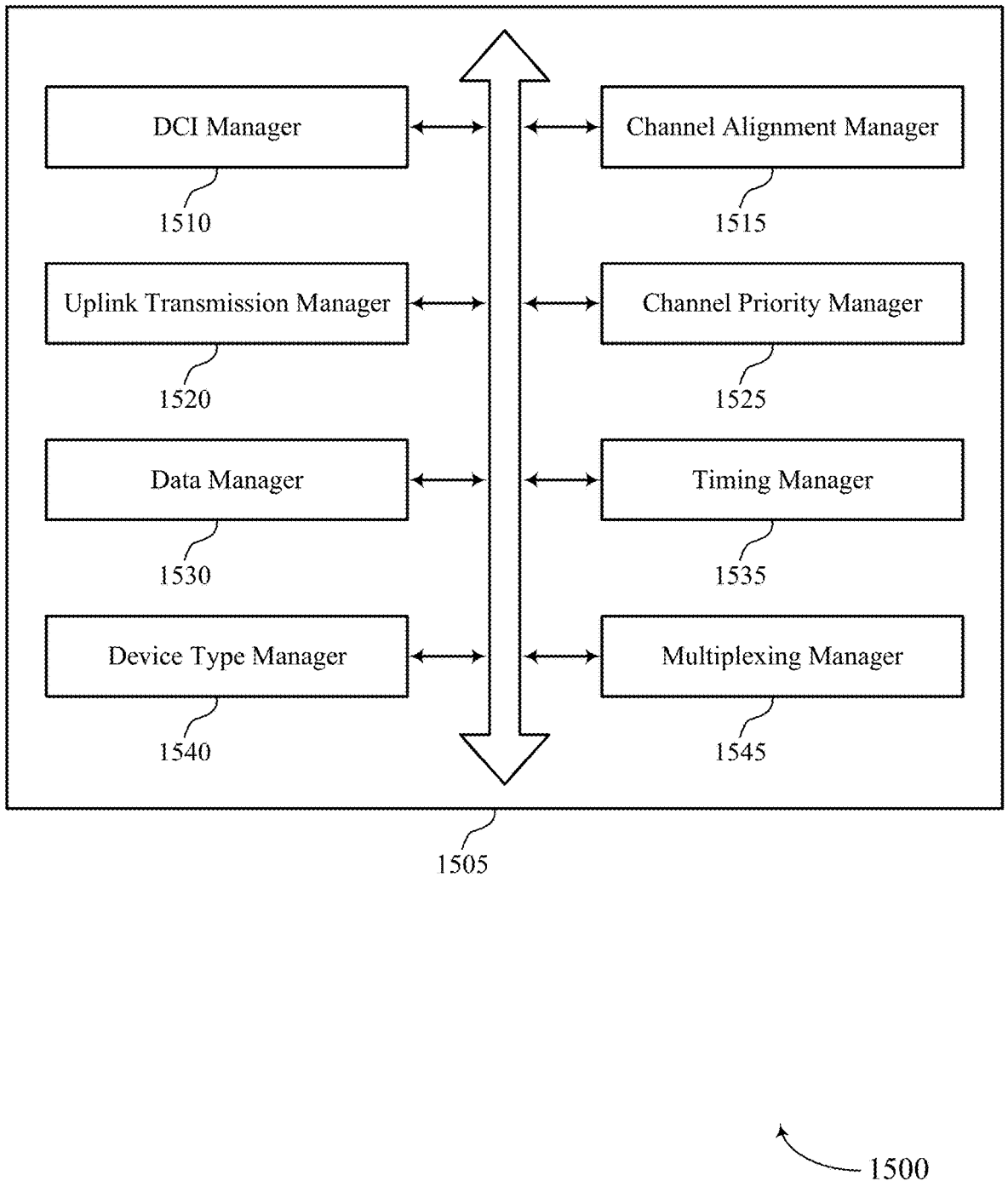
FIG. 15 shows a block diagram of a communications manager that supports UCI multiplexing rule simplification for reduced capability UEs in accordance with aspects of the present disclosure.

FIG. 15 shows a block diagram 1500 of a communications manager 1505 that supports UCI multiplexing rule simplification for reduced capability UEs in accordance with aspects of the present disclosure. The communications manager 1505 may be an example of aspects of a communications manager 1315, a communications manager 1415, or a communications manager 1610 described herein. The communications manager 1505 may include a DCI manager 1510, a channel alignment manager 1515, an uplink transmission manager 1520, a channel priority manager 1525, a data manager 1530, a timing manager 1535, a device type manager 1540, and a multiplexing manager 1545. Each of these modules may communicate, directly or indirectly, with one another (e.g., via one or more buses).

The DCI manager 1510 may transmit a downlink control message indicating a grant of resources for an uplink data transmission on an uplink shared channel. In some examples, the DCI manager 1510 may transmit, to the UE, a downlink control message indicating a grant of resources for an uplink data transmission on an uplink shared channel of a second CC, the uplink shared channel at least partially overlapping with an uplink control channel for UCI on a first CC. In some examples, the DCI manager 1510 may transmit a second downlink control message including a grant of resources corresponding to an uplink data transmission on the second uplink channel, the downlink control message including a first priority indicator for the second uplink channel.

In some examples, the DCI manager 1510 may transmit a third downlink control message including a grant of resources corresponding to a downlink data transmission on a second downlink shared channel, where UCI including an acknowledgement feedback message on the second uplink channel corresponds to the downlink data transmission on the second downlink shared channel, the third downlink control message including a second priority indicator for the first uplink channel. In some examples, the DCI manager 1510 may transmit a second downlink control message indicating a grant of resources for a second uplink data transmission on a second uplink shared channel of the first CC, the second uplink data transmission at least partially overlapping with a second uplink control channel for second UCI.

The channel alignment manager 1515 may determine that a first symbol period of the uplink shared channel is aligned with a first symbol period of an uplink control channel for UCI. In some examples, the channel alignment manager 1515 may determine that a time between the first symbol period of the uplink shared channel and the first symbol period of the uplink control channel satisfies a threshold time. In some cases, a first uplink channel at least partially overlaps with a second uplink channel, and where a first symbol period of the first uplink channel is not aligned with a first symbol period of the second uplink channel.

The uplink transmission manager 1520 may receive, based on determining that the first symbol period of the uplink shared channel is aligned with the first symbol period of the uplink control channel, the UCI and the uplink data transmission multiplexed on the uplink shared channel. In some examples, the uplink transmission manager 1520 may receive, based on the UE being the first type, the UCI on the uplink control channel on the first CC and the uplink data transmission on the uplink shared channel of the second CC. In some examples, the uplink transmission manager 1520 may receive, based on the UE being the first type, both the second UCI and the second uplink data transmission over the second uplink shared channel on the first CC. In some examples, the uplink transmission manager 1520 may receive, based on the UE being the first type, both the second UCI and the uplink data transmission over the uplink shared channel on the second CC.

The device type manager 1540 may identify that a UE is a first type of a set of UE types, where a second type of the set of UE types is associated with multiplexing UCI and uplink data transmissions across multiple CCs. In some cases, the UE is a first type of a set of UE types, the first type of UE of the set of UE types configured to perform a first UCI multiplexing procedure based on determining that the first symbol period of the uplink shared channel is aligned with the first symbol period of the uplink control channel, and a second type of UE of the set of UEs configured to perform a second UCI multiplexing procedure based on determining that the first symbol period of the uplink shared channel is aligned with the first symbol period of the uplink control channel, where the first UCI multiplexing procedure includes multiplexing the UCI and the uplink data transmission on the uplink shared channel and transmitting the multiplexed UCI and uplink data transmission on the uplink shared channel. In some cases, the first type of UE of the set of UE types is associated with a first capability level and a second type of UE of the set of UE types is associated with a second capability level. In some cases, the first type of UE of the set of UE types is configured to perform a first UCI multiplexing procedure including transmitting the uplink control channel on the first CC and the uplink data transmission on the uplink shared channel on the second CC, and where a second type of UE of the set of UEs configured to perform a second UCI multiplexing procedure.

The channel priority manager 1525 may receive an uplink message over the first uplink channel based on the first priority level and the second priority level. In some examples, the channel priority manager 1525 may transmit a second downlink control message including a grant of resources corresponding to an uplink data transmission on the first uplink channel, the downlink control message including a first priority indicator for the first uplink channel.

In some examples, the channel priority manager 1525 may transmit a third downlink control message including a grant of resources corresponding to a downlink data transmission on a second downlink shared channel, where UCI including an acknowledgement feedback message on the second uplink channel corresponds to the downlink data transmission on the second downlink shared channel, the third downlink control message including a second priority indicator for the second uplink channel. In some cases, the first uplink channel is earlier in time than the first symbol period of the second uplink channel, where receiving an uplink message over the first uplink channel is based on the first symbol of the first uplink channel being earlier in time than the first symbol period of the second uplink channel. In some cases, the first uplink channel is an uplink control channel, and where the second uplink channel is an uplink shared channel. In some cases, the first uplink channel is an uplink shared channel, and where the second uplink channel is an uplink control channel.

The data manager 1530 may transmit a downlink data transmission on a downlink shared channel, where the UCI includes acknowledgement feedback corresponding to the data transmission on the downlink shared channel.

The timing manager 1535 may determine that a first time between transmitting the downlink data transmission and receiving both the acknowledgement feedback and the uplink data transmission satisfies a first threshold time. In some examples, the timing manager 1535 may determine that a second time between transmitting the downlink control message and receiving both the acknowledgement feedback and the uplink data transmission satisfies a second threshold time, where receiving both the acknowledgement feedback and the uplink data transmission is based on the first time satisfying the first threshold time and the second time satisfying the second threshold time.

The multiplexing manager 1545 may determine that the second UCI and the second uplink data transmission are multiplexed on the first CC.

In some cases, the DCI manager 1510, the channel alignment manager 1515, the uplink transmission manager 1520, the channel priority manager 1525, the data manager 1530, the timing manager 1535, the device type manager 1540, and the multiplexing manager 1545 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI manager 1510, the channel alignment manager 1515, the uplink transmission manager 1520, the channel priority manager 1525, the data manager 1530, the timing manager 1535, the device type manager 1540, and the multiplexing manager 1545 discussed herein.

Figure 16:
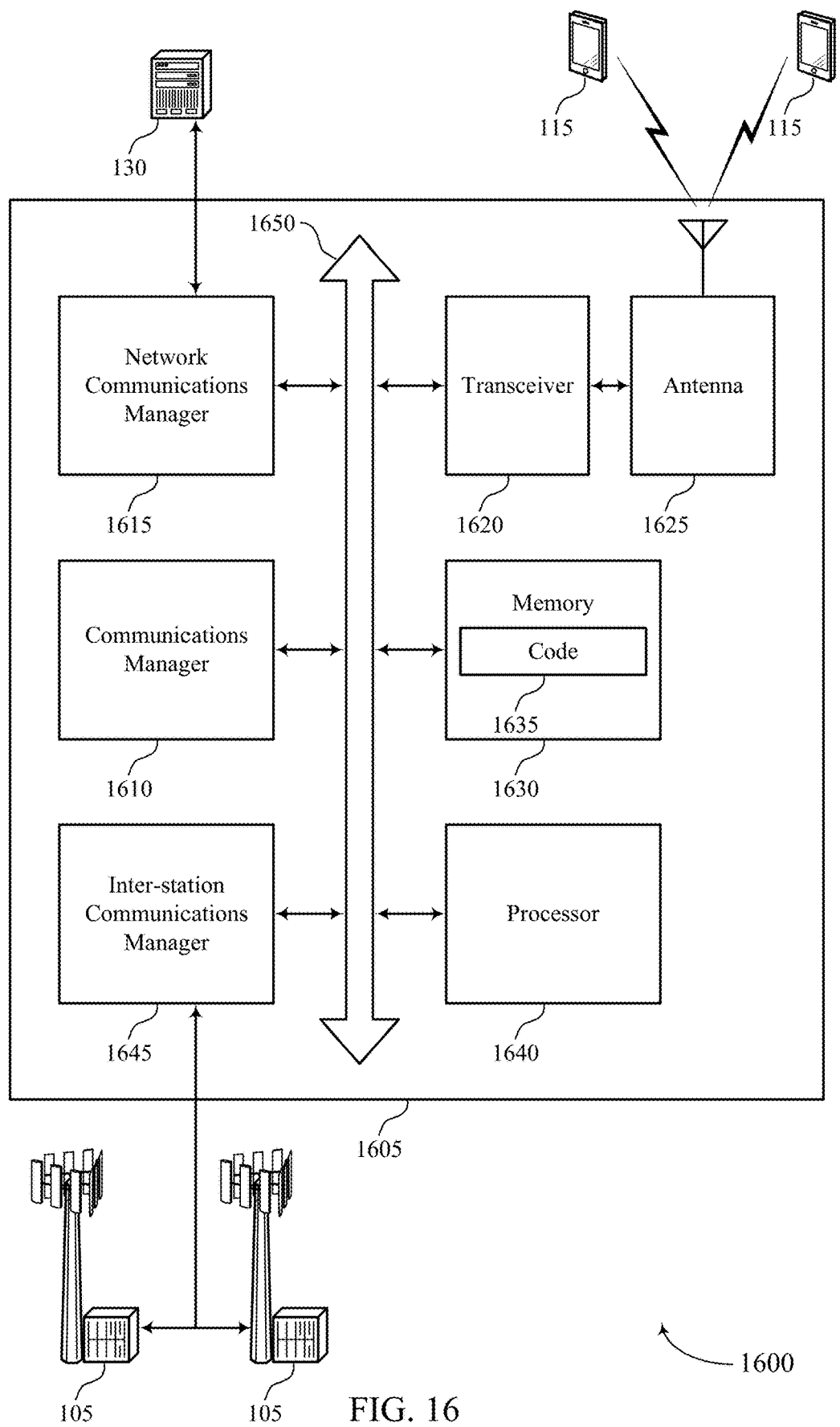
FIG. 16 shows a diagram of a system including a device that supports UCI multiplexing rule simplification for reduced capability UEs in accordance with aspects of the present disclosure.

FIG. 16 shows a diagram of a system 1600 including a device 1605 that supports UCI multiplexing rule simplification for reduced capability UEs in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit a downlink control message indicating a grant of resources for an uplink data transmission on an uplink shared channel, determine that a first symbol period of the uplink shared channel is aligned with a first symbol period of an uplink control channel for UCI, and receive, based on determining that the first symbol period of the uplink shared channel is aligned with the first symbol period of the uplink control channel, the UCI and the uplink data transmission multiplexed on the uplink shared channel. The communications manager 1610 may also identify that a UE is a first type of a set of UE types, where a second type of the set of UE types is associated with multiplexing UCI and uplink data transmissions across multiple CCs, transmit, to the UE, a downlink control message indicating a grant of resources for an uplink data transmission on an uplink shared channel of a second CC, the uplink shared channel at least partially overlapping with an uplink control channel for UCI on a first CC, and receive, based on the UE being the first type, the UCI on the uplink control channel on the first CC and the uplink data transmission on the uplink shared channel of the second CC.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting UCI multiplexing rule simplification for reduced capability UEs).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
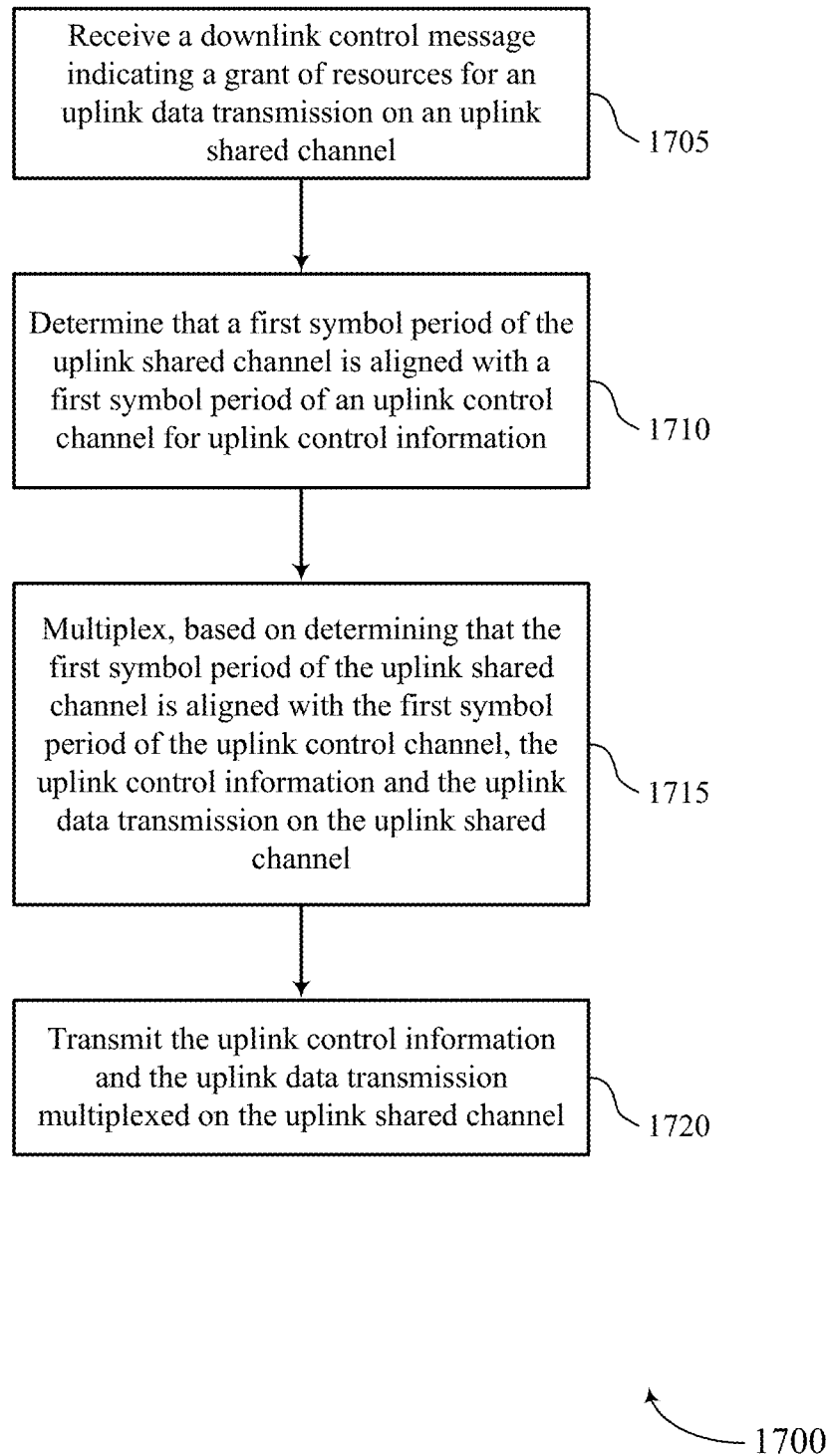
FIGS. 17 through 20 show flowcharts illustrating methods that support UCI multiplexing rule simplification for reduced capability UEs in accordance with aspects of the present disclosure.

FIG. 17 shows a flowchart illustrating a method 1700 that supports UCI multiplexing rule simplification for reduced capability UEs in accordance with aspects of the present disclosure. The operations of method 1700 may be implemented by a UE 115 or its components as described herein.

For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may receive a downlink control message indicating a grant of resources for an uplink data transmission on an uplink shared channel. The operations of 1705 may be performed according to the methods described herein. In some examples, aspects of the operations of 1705 may be performed by a DCI manager as described with reference to FIGS. 9 through 12.

At 1710, the UE may determine that a first symbol period of the uplink shared channel is aligned with a first symbol period of an uplink control channel for UCI. The operations of 1710 may be performed according to the methods described herein. In some examples, aspects of the operations of 1710 may be performed by a channel alignment manager as described with reference to FIGS. 9 through 12.

At 1715, the UE may multiplex, based on determining that the first symbol period of the uplink shared channel is aligned with the first symbol period of the uplink control channel, the UCI and the uplink data transmission on the uplink shared channel. The operations of 1715 may be performed according to the methods described herein. In some examples, aspects of the operations of 1715 may be performed by a multiplexing manager as described with reference to FIGS. 9 through 12.

At 1720, the UE may transmit the UCI and the uplink data transmission multiplexed on the uplink shared channel. The operations of 1720 may be performed according to the methods described herein. In some examples, aspects of the operations of 1720 may be performed by a multiplexing manager as described with reference to FIGS. 9 through 12.

Figure 18:
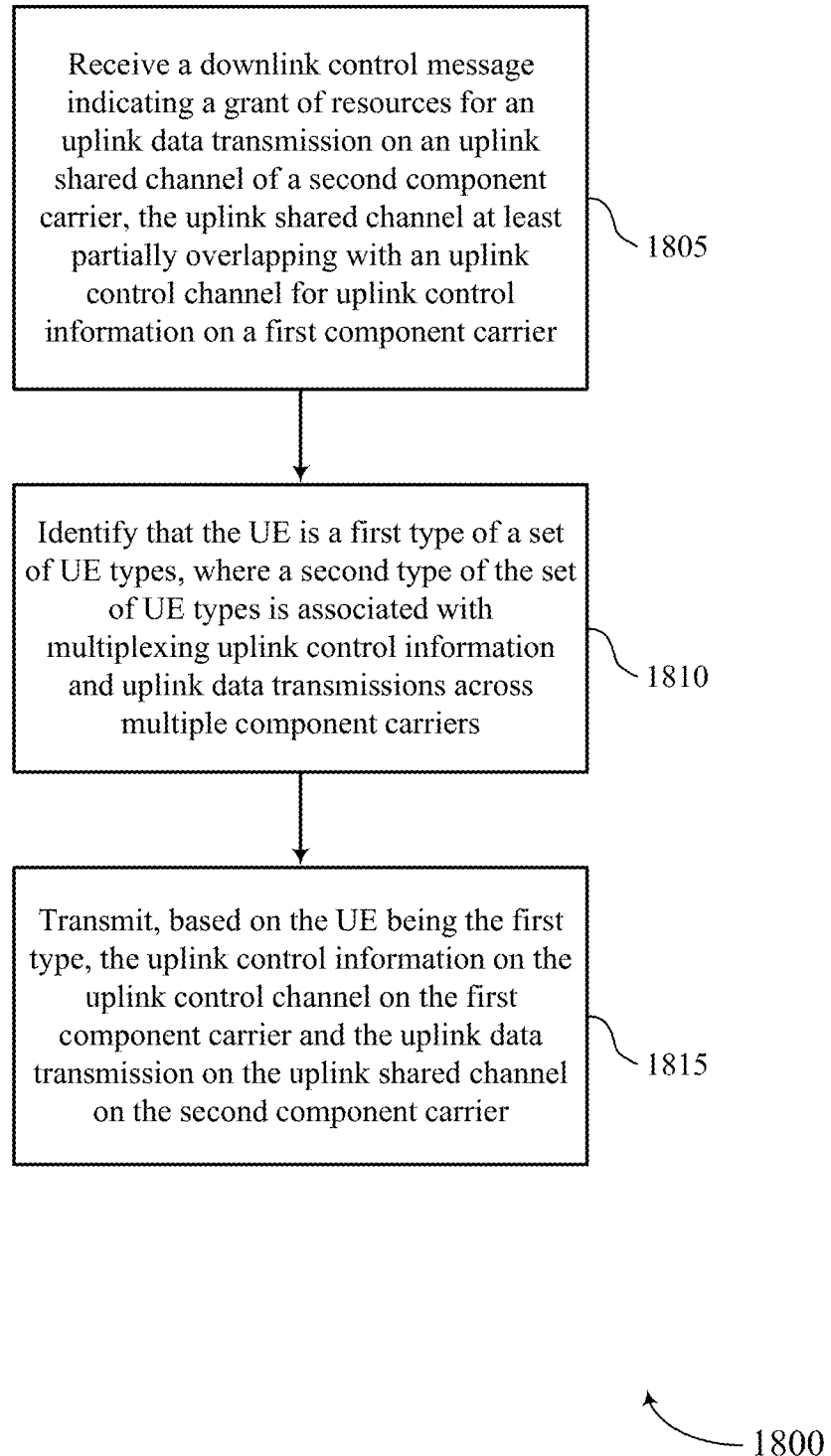

FIG. 18 shows a flowchart illustrating a method 1800 that supports UCI multiplexing rule simplification for reduced capability UEs in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1805, the UE may receive a downlink control message indicating a grant of resources for an uplink data transmission on an uplink shared channel of a second CC, the uplink shared channel at least partially overlapping with an uplink control channel for UCI on a first CC. The operations of 1805 may be performed according to the methods described herein. In some examples, aspects of the operations of 1805 may be performed by a DCI manager as described with reference to FIGS. 9 through 12.

At 1810, the UE may identify that the UE is a first type of a set of UE types, where a second type of the set of UE types is associated with multiplexing UCI and uplink data transmissions across multiple CCs. The operations of 1810 may be performed according to the methods described herein. In some examples, aspects of the operations of 1810 may be performed by a device type manager as described with reference to FIGS. 9 through 12.

At 1815, the UE may transmit, based on the UE being the first type, the UCI on the uplink control channel on the first CC and the uplink data transmission on the uplink shared channel on the second CC. The operations of 1815 may be performed according to the methods described herein. In some examples, aspects of the operations of 1815 may be performed by an uplink transmission manager as described with reference to FIGS. 9 through 12.

Figure 19:
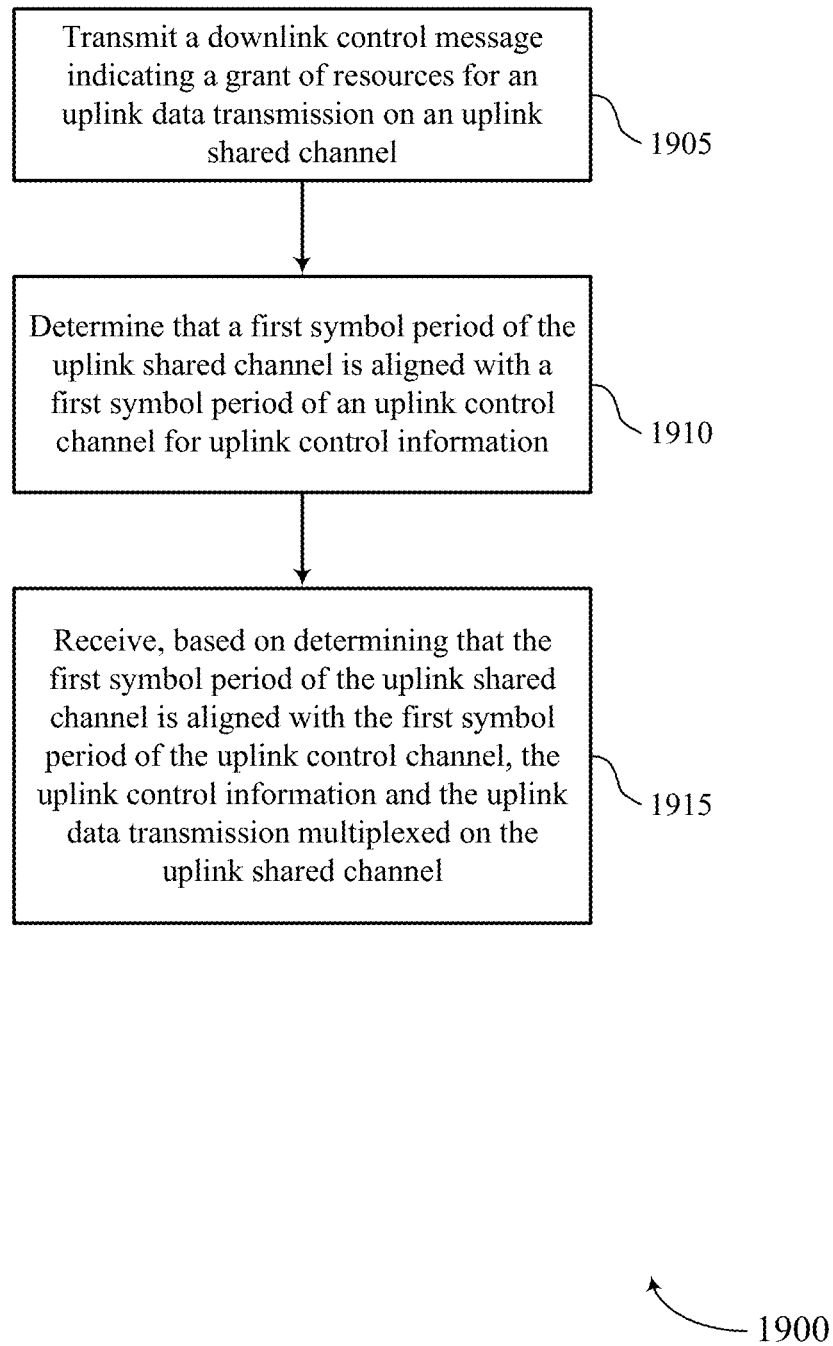

FIG. 19 shows a flowchart illustrating a method 1900 that supports UCI multiplexing rule simplification for reduced capability UEs in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1905, the base station may transmit a downlink control message indicating a grant of resources for an uplink data transmission on an uplink shared channel. The operations of 1905 may be performed according to the methods described herein. In some examples, aspects of the operations of 1905 may be performed by a DCI manager as described with reference to FIGS. 13 through 16.

At 1910, the base station may determine that a first symbol period of the uplink shared channel is aligned with a first symbol period of an uplink control channel for UCI. The operations of 1910 may be performed according to the methods described herein. In some examples, aspects of the operations of 1910 may be performed by a channel alignment manager as described with reference to FIGS. 13 through 16.

At 1915, the base station may receive, based on determining that the first symbol period of the uplink shared channel is aligned with the first symbol period of the uplink control channel, the UCI and the uplink data transmission multiplexed on the uplink shared channel. The operations of 1915 may be performed according to the methods described herein. In some examples, aspects of the operations of 1915 may be performed by an uplink transmission manager as described with reference to FIGS. 13 through 16.

Figure 20:
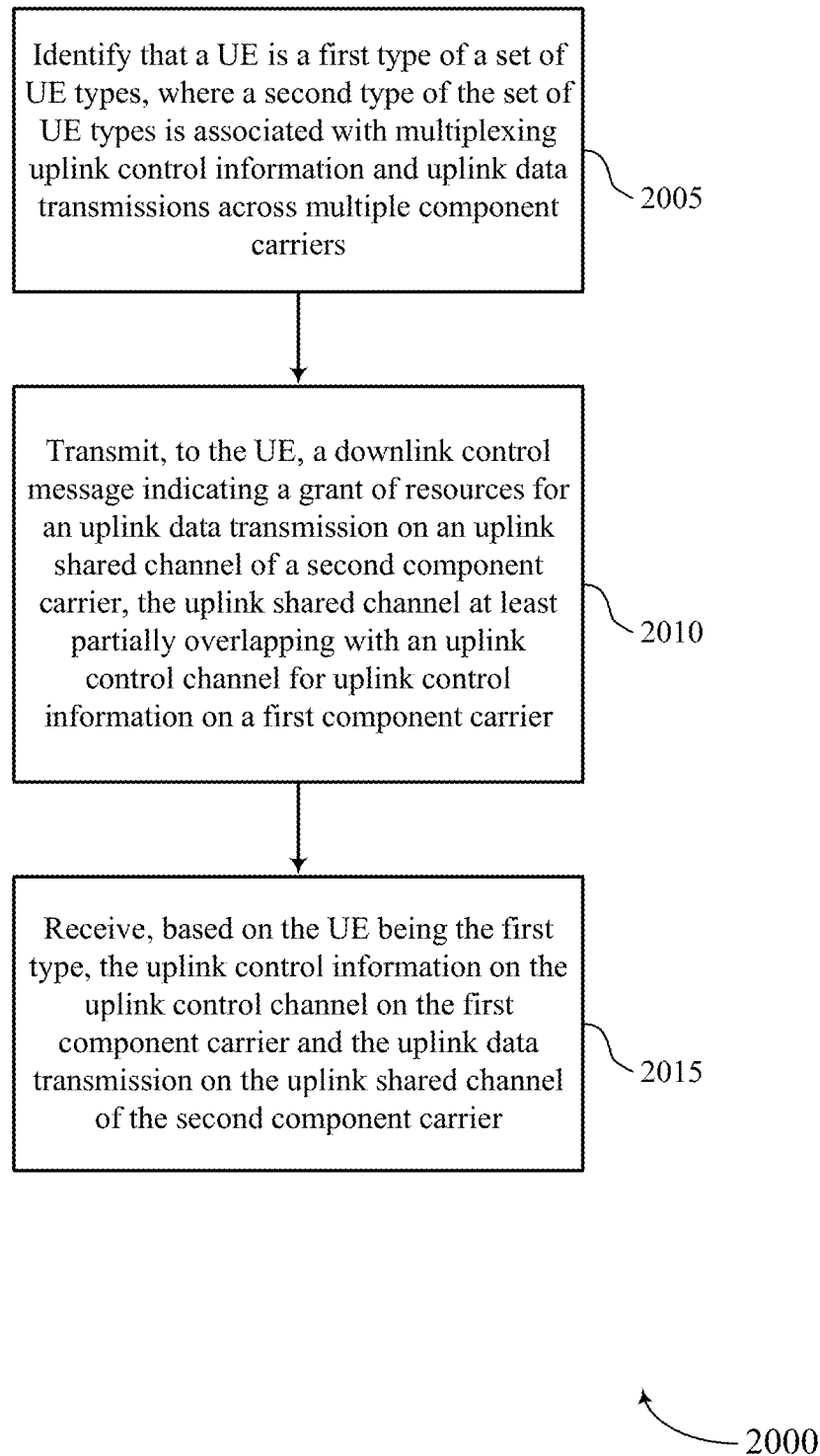

FIG. 20 shows a flowchart illustrating a method 2000 that supports UCI multiplexing rule simplification for reduced capability UEs in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 2005, the base station may identify that a UE is a first type of a set of UE types, where a second type of the set of UE types is associated with multiplexing UCI and uplink data transmissions across multiple CCs. The operations of 2005 may be performed according to the methods described herein. In some examples, aspects of the operations of 2005 may be performed by a device type manager as described with reference to FIGS. 13 through 16.

At 2010, the base station may transmit, to the UE, a downlink control message indicating a grant of resources for an uplink data transmission on an uplink shared channel of a second CC, the uplink shared channel at least partially overlapping with an uplink control channel for UCI on a first CC. The operations of 2010 may be performed according to the methods described herein. In some examples, aspects of the operations of 2010 may be performed by a DCI manager as described with reference to FIGS. 13 through 16.

At 2015, the base station may receive, based on the UE being the first type, the UCI on the uplink control channel on the first CC and the uplink data transmission on the uplink shared channel of the second CC. The operations of 2015 may be performed according to the methods described herein. In some examples, aspects of the operations of 2015 may be performed by an uplink transmission manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a downlink control message indicating a grant of resources for an uplink data transmission on an uplink shared channel; determining that a first symbol period of the uplink shared channel is aligned with a first symbol period of an uplink control channel for uplink control information; multiplexing, based at least in part on determining that the first symbol period of the uplink shared channel is aligned with the first symbol period of the uplink control channel, the uplink control information and the uplink data transmission on the uplink shared channel; and transmitting the uplink control information and the uplink data transmission multiplexed on the uplink shared channel.

Aspect 2: The method of aspect 1, wherein the uplink shared channel and the uplink control channel are during a first transmission time interval, the method further comprising: determining, during a second transmission time interval, that a first uplink channel at least partially overlaps with a second uplink channel; and determining to drop one of the first uplink channel or the second uplink channel based at least in part on identifying that a first symbol period of the first uplink channel is misaligned with a first symbol period of the second uplink channel.

Aspect 3: The method of aspect 2, further comprising: determining that the first uplink channel has a first priority level and that the second uplink channel has a second priority level that is lower priority than the first priority level; transmitting an uplink message on the first uplink channel based at least in part on the second priority level being the lower priority than the first priority level; and dropping the second uplink channel based at least in part on the second priority level being the lower priority than the first priority level.

Aspect 4: The method of any of aspects 2 through 3, further comprising: identifying a first priority indicator for the first uplink channel and a second priority indicator for the second uplink channel; and comparing the first priority indicator and the second priority indicator, wherein determining that the first uplink channel has a first priority level and that the second uplink channel has a second priority level that is lower priority than the first priority level is based at least in part on comparing the first priority indicator and the second priority indicator.

Aspect 5: The method of any of aspects 2 through 4, further comprising: determining that the first symbol period of the first uplink channel is first in time, wherein determining that the first uplink channel has a first priority level and that the second uplink channel has a second priority level that is lower priority than the first priority level is based at least in part on determining that the first symbol period of the first uplink channel is first in time.

Aspect 6: The method of any of aspects 2 through 5, wherein the first uplink channel comprises a second uplink control channel and the second uplink channel comprises a third uplink control channel.

Aspect 7: The method of any of aspects 2 through 6, wherein the first uplink channel comprises a second uplink shared channel and the second uplink channel comprises a second uplink control channel.

Aspect 8: The method of any of aspects 1 through 7, wherein determining that the first symbol period of the uplink shared channel is aligned with the first symbol period of the uplink control channel comprises: determining that a time between the first symbol period of the uplink shared channel and the first symbol period of the uplink control channel satisfies a threshold time.

Aspect 9: The method of any of aspects 1 through 8, further comprising: receiving a downlink data transmission on a downlink shared channel, wherein the uplink control information comprises acknowledgement feedback corresponding to the data transmission on the downlink shared channel.

Aspect 10: The method of aspect 9, further comprising: determining that a first time between receiving the downlink data transmission and transmitting the acknowledgement feedback and the uplink data transmission satisfies a first threshold time; and determining that a second time between receiving the downlink control message and transmitting the acknowledgement feedback and the uplink data transmission satisfies a second threshold time, wherein multiplexing the acknowledgement feedback and the uplink data transmission is based at least in part on the first time satisfying the first threshold time and the second time satisfying the second threshold time.

Aspect 11: The method of any of aspects 1 through 10, further comprising: identifying that the UE is a first type of a set of UE types, the first type of UE of the set of UE types configured to perform a first UCI multiplexing procedure based at least in part on determining that the first symbol period of the uplink shared channel is aligned with the first symbol period of the uplink control channel, and a second type of UE of the set of UEs configured to perform a second UCI multiplexing procedure based at least in part on determining that the first symbol period of the uplink shared channel is aligned with the first symbol period of the uplink control channel, wherein the first UCI multiplexing procedure comprises multiplexing the uplink control information and the uplink data transmission on the uplink shared channel.

Aspect 12: The method of aspect 11, wherein the first type of UE of the set of UE types is associated with a first capability level and the second type of UE of the set of UE types is associated with a second capability level.

Aspect 13: The method of any of aspects 1 through 12, wherein multiplexing the uplink control information and the uplink data transmission comprises: multiplexing a payload of the uplink control channel with a payload of the uplink shared channel to generate a multiplexed payload, wherein transmitting both the uplink control information and the uplink data transmission comprises transmitting the multiplexed payload.

Aspect 14: The method of aspect 13, wherein multiplexing the uplink control information and the uplink data transmission further comprises: dropping the uplink control channel.

Aspect 15: The method of any of aspects 1 through 14, wherein the uplink control information comprises channel state information, or a scheduling request, or acknowledgement feedback, or a combination thereof.

Aspect 16: A method for wireless communications at a UE, comprising: receiving a downlink control message indicating a grant of resources for an uplink data transmission on an uplink shared channel of a second component carrier, the uplink shared channel at least partially overlapping with an uplink control channel for uplink control information on a first component carrier; identifying that the UE is a first type of a set of UE types, wherein a second type of the set of UE types is associated with multiplexing uplink control information and uplink data transmissions across multiple component carriers; and transmitting, based at least in part on the UE being the first type, the uplink control information on the uplink control channel on the first component carrier and the uplink data transmission on the uplink shared channel on the second component carrier.

Aspect 17: The method of aspect 16, further comprising: refraining, based at least in part on the UE being the first type, from multiplexing the uplink control information and the uplink data transmission on the first component carrier; or; refraining, based at least in part on the UE being the first type, from multiplexing the uplink control information and the uplink data transmission on the second component carrier; or both.

Aspect 18: The method of any of aspects 16 through 17, wherein the first type of UE of the set of UE types is configured to perform a first UCI multiplexing procedure comprising transmitting the uplink control channel on the first component carrier and the uplink data transmission on the uplink shared channel on the second component carrier, and the second type of UE of the set of UEs configured to perform a UCI multiplexing second procedure.

Aspect 19: The method of any of aspects 16 through 18, further comprising: receiving a second downlink control message indicating a grant of resources for a second uplink data transmission on a second uplink shared channel of the first component carrier, the second uplink data transmission at least partially overlapping with a second uplink control channel for second uplink control information; and transmitting, based at least in part on the UE being the first type, both the second uplink control information and the second uplink data transmission over the second uplink shared channel on the first component carrier.

Aspect 20: The method of aspect 19, wherein transmitting both the second uplink control information and the second uplink data transmission comprises: multiplexing the second uplink control information and the second uplink data transmission on the first component carrier.

Aspect 21: The method of any of aspects 16 through 20, wherein a second uplink control channel for second uplink control information on the second component carrier at least partially overlaps with the uplink shared channel on the second component carrier, further comprising: transmitting, based at least in part on the UE being the first type, both the second uplink control information and the uplink data transmission on the uplink shared channel on the second component carrier.

Aspect 22: The method of any of aspects 16 through 21, wherein the uplink control information comprises channel state information, or a scheduling request, or acknowledgement feedback, or a combination thereof.

Aspect 23: A method for wireless communications at a base station, comprising: transmitting a downlink control message indicating a grant of resources for an uplink data transmission on an uplink shared channel; determining that a first symbol period of the uplink shared channel is aligned with a first symbol period of an uplink control channel for uplink control information; and receiving, based at least in part on determining that the first symbol period of the uplink shared channel is aligned with the first symbol period of the uplink control channel, the uplink control information and the uplink data transmission multiplexed on the uplink shared channel.

Aspect 24: The method of aspect 23, wherein a first uplink channel at least partially overlaps with a second uplink channel, and a first symbol period of the first uplink channel is not aligned with a first symbol period of the second uplink channel.

Aspect 25: The method of aspect 24, wherein the first uplink channel has a first priority level and the second uplink channel has a second priority level that is lower priority than the first priority level, further comprising: receiving an uplink message over the first uplink channel based at least in part on the first priority level and the second priority level.

Aspect 26: The method of any of aspects 24 through 25, further comprising: transmitting a second downlink control message comprising a grant of resources corresponding to an uplink data transmission on the first uplink channel, the downlink control message comprising a first priority indicator for the first uplink channel; and transmitting a third downlink control message comprising a grant of resources corresponding to a downlink data transmission on a second downlink shared channel, wherein uplink control information comprising an acknowledgement feedback message on the second uplink channel corresponds to the downlink data transmission on the second downlink shared channel, the third downlink control message comprising a second priority indicator for the second uplink channel.

Aspect 27: A method for wireless communications at a base station, comprising: identifying that a UE is a first type of a set of UE types, wherein a second type of the set of UE types is associated with multiplexing uplink control information and uplink data transmissions across multiple component carriers; transmitting, to the UE, a downlink control message indicating a grant of resources for an uplink data transmission on an uplink shared channel of a second component carrier, the uplink shared channel at least partially overlapping with an uplink control channel for uplink control information on a first component carrier; and receiving, based at least in part on the UE being the first type, the uplink control information on the uplink control channel on the first component carrier and the uplink data transmission on the uplink shared channel of the second component carrier.

Aspect 28: The method of aspect 27, wherein the first type of UE of the set of UE types is configured to perform a first UCI multiplexing procedure comprising transmitting the uplink control channel on the first component carrier and the uplink data transmission on the uplink shared channel on the second component carrier, and the second type of UE of the set of UEs configured to perform a second UCI multiplexing procedure.

Aspect 29: The method of any of aspects 27 through 28, further comprising: transmitting a second downlink control message indicating a grant of resources for a second uplink data transmission on a second uplink shared channel of the first component carrier, the second uplink data transmission at least partially overlapping with a second uplink control channel for second uplink control information; and receiving, based at least in part on the UE being the first type, both the second uplink control information and the second uplink data transmission over the second uplink shared channel on the first component carrier.

Aspect 30: The method of aspect 29, wherein the second uplink control information and the second uplink data transmission are multiplexed on the first component carrier.

Aspect 31: An apparatus for wireless communications at a UE, comprising a processor; memory coupled with the processor; and instructions stored in the memory and executable by the processor to cause the apparatus to perform a method of any of aspects 1 through 15.

Aspect 32: An apparatus for wireless communications at a UE, comprising at least one means for performing a method of any of aspects 1 through 15.

Aspect 33: A non-transitory computer-readable medium storing code for wireless communications at a UE, the code comprising instructions executable by a processor to perform a method of any of aspects 1 through 15.

Aspect 34: An apparatus for wireless communications at a UE, comprising a processor; memory coupled with the processor; and instructions stored in the memory and executable by the processor to cause the apparatus to perform a method of any of aspects 16 through 22.

Aspect 35: An apparatus for wireless communications at a UE, comprising at least one means for performing a method of any of aspects 16 through 22.

Aspect 36: A non-transitory computer-readable medium storing code for wireless communications at a UE, the code comprising instructions executable by a processor to perform a method of any of aspects 16 through 22.

Aspect 37: An apparatus for wireless communications at a base station, comprising a processor; memory coupled with the processor; and instructions stored in the memory and executable by the processor to cause the apparatus to perform a method of any of aspects 23 through 26.

Aspect 38: An apparatus for wireless communications at a base station, comprising at least one means for performing a method of any of aspects 23 through 26.

Aspect 39: A non-transitory computer-readable medium storing code for wireless communications at a base station, the code comprising instructions executable by a processor to perform a method of any of aspects 23 through 26.

Aspect 40: An apparatus for wireless communications at a base station, comprising a processor; memory coupled with the processor; and instructions stored in the memory and executable by the processor to cause the apparatus to perform a method of any of aspects 27 through 30.

Aspect 41: An apparatus for wireless communications at a base station, comprising at least one means for performing a method of any of aspects 27 through 30.

Aspect 42: A non-transitory computer-readable medium storing code for wireless communications at a base station, the code comprising instructions executable by a processor to perform a method of any of aspects 27 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a downlink control message indicating a grant of resources for an uplink data transmission on an uplink shared channel, wherein the uplink shared channel at least partially overlaps with an uplink control channel for uplink control information;
   determining that a first symbol period of the uplink shared channel is aligned with a first symbol period of the uplink control channel;
   multiplexing, based at least in part on the UE being a first type of UE of a set of UE types and determining that the first symbol period of the uplink shared channel is aligned with the first symbol period of the uplink control channel, the uplink control information and the uplink data transmission on the uplink shared channel, wherein the first type of UE of the set of UE types is configured to perform a first UCI multiplexing procedure when the uplink shared channel at least partially overlaps with the uplink control channel, and wherein a second type of UE of the set of UEs is configured to perform a different UCI multiplexing procedure when the uplink shared channel at least partially overlaps with the uplink control channel; and
   transmitting the uplink control information and the uplink data transmission multiplexed on the uplink shared channel.

2. The method of claim 1, wherein the uplink shared channel and the uplink control channel are during a first transmission time interval, the method further comprising:
   determining, during a second transmission time interval, that a first uplink channel at least partially overlaps with a second uplink channel; and
   determining to drop one of the first uplink channel or the second uplink channel based at least in part on identifying that a first symbol period of the first uplink channel is misaligned with a first symbol period of the second uplink channel.

3. The method of claim 2, further comprising:
   determining that the first uplink channel has a first priority level and that the second uplink channel has a second priority level that is lower priority than the first priority level;
   transmitting an uplink message on the first uplink channel based at least in part on the second priority level being the lower priority than the first priority level; and
   dropping the second uplink channel based at least in part on the second priority level being the lower priority than the first priority level.

4. The method of claim 2, further comprising:
   identifying a first priority indicator for the first uplink channel and a second priority indicator for the second uplink channel; and
   comparing the first priority indicator and the second priority indicator, wherein determining that the first uplink channel has a first priority level and that the second uplink channel has a second priority level that is lower priority than the first priority level is based at least in part on comparing the first priority indicator and the second priority indicator.

5. The method of claim 2, further comprising:
   determining that the first symbol period of the first uplink channel is first in time, wherein determining that the first uplink channel has a first priority level and that the second uplink channel has a second priority level that is lower priority than the first priority level is based at least in part on determining that the first symbol period of the first uplink channel is first in time.

6. The method of claim 2, wherein the first uplink channel comprises a second uplink control channel and the second uplink channel comprises a third uplink control channel.

7. The method of claim 2, wherein the first uplink channel comprises a second uplink shared channel and the second uplink channel comprises a second uplink control channel.

8. The method of claim 1, wherein determining that the first symbol period of the uplink shared channel is aligned with the first symbol period of the uplink control channel comprises:
   determining that a time between the first symbol period of the uplink shared channel and the first symbol period of the uplink control channel satisfies a threshold time.

9. The method of claim 1, further comprising:
   receiving a downlink data transmission on a downlink shared channel, wherein the uplink control information comprises acknowledgement feedback corresponding to the data transmission on the downlink shared channel.

10. The method of claim 9, further comprising:
determining that a first time between receiving the downlink data transmission and transmitting the acknowledgement feedback and the uplink data transmission satisfies a first threshold time; and
determining that a second time between receiving the downlink control message and transmitting the acknowledgement feedback and the uplink data transmission satisfies a second threshold time, wherein multiplexing the acknowledgement feedback and the uplink data transmission is based at least in part on the first time satisfying the first threshold time and the second time satisfying the second threshold time.

11. The method of claim 1, wherein the first type of UE of the set of UE types is associated with a first capability level and the second type of UE of the set of UE types is associated with a second capability level.

12. The method of claim 1, wherein multiplexing the uplink control information and the uplink data transmission comprises:
multiplexing a payload of the uplink control channel with a payload of the uplink shared channel to generate a multiplexed payload, wherein transmitting both the uplink control information and the uplink data transmission comprises transmitting the multiplexed payload.

13. The method of claim 12, wherein multiplexing the uplink control information and the uplink data transmission further comprises:
dropping the uplink control channel.

14. The method of claim 1, wherein the uplink control information comprises channel state information, or a scheduling request, or acknowledgement feedback, or a combination thereof.

15. A method for wireless communications at a user equipment (UE), comprising:
receiving a downlink control message indicating a grant of resources for an uplink data transmission on an uplink shared channel of a second component carrier, the uplink shared channel at least partially overlapping with an uplink control channel for uplink control information on a first component carrier;
identifying that the UE is a first type of a set of UE types, wherein a second type of the set of UE types is associated with multiplexing uplink control information and uplink data transmissions across multiple component carriers; and
transmitting, based at least in part on the UE being the first type, the uplink control information on the uplink control channel on the first component carrier and the uplink data transmission on the uplink shared channel on the second component carrier.

16. The method of claim 15, further comprising:
refraining, based at least in part on the UE being the first type, from multiplexing the uplink control information and the uplink data transmission on the first component carrier;
refraining, based at least in part on the UE being the first type, from multiplexing the uplink control information and the uplink data transmission on the second component carrier; or
both.

17. The method of claim 15, wherein the first type of UE of the set of UE types is configured to perform a first UCI multiplexing procedure comprising transmitting the uplink control channel on the first component carrier and the uplink data transmission on the uplink shared channel on the second component carrier, and wherein the second type of UE of the set of UEs configured to perform a different UCI multiplexing procedure.

18. The method of claim 15, further comprising:
receiving a second downlink control message indicating a grant of resources for a second uplink data transmission on a second uplink shared channel of the first component carrier, the second uplink data transmission at least partially overlapping with a second uplink control channel for second uplink control information; and
transmitting, based at least in part on the UE being the first type, both the second uplink control information and the second uplink data transmission over the second uplink shared channel on the first component carrier.

19. The method of claim 18, wherein transmitting both the second uplink control information and the second uplink data transmission comprises:
multiplexing the second uplink control information and the second uplink data transmission on the first component carrier.

20. The method of claim 15, wherein a second uplink control channel for second uplink control information on the second component carrier at least partially overlaps with the uplink shared channel on the second component carrier, further comprising:
transmitting, based at least in part on the UE being the first type, both the second uplink control information and the uplink data transmission on the uplink shared channel on the second component carrier.

21. The method of claim 15, wherein the uplink control information comprises channel state information, or a scheduling request, or acknowledgement feedback, or a combination thereof.

22. An apparatus for wireless communications at a user equipment (UE), comprising:
memory; and
one or more processors coupled with the memory and configured to cause the UE to:
receive a downlink control message indicating a grant of resources for an uplink data transmission on an uplink shared channel, wherein the uplink shared channel at least partially overlaps with an uplink control channel for uplink control information;
determine that a first symbol period of the uplink shared channel is aligned with a first symbol period of the uplink control channel;
multiplex, based at least in part on the UE being a first type of UE of a set of UE types and the determination that the first symbol period of the uplink shared channel is aligned with the first symbol period of the uplink control channel, the uplink control information and the uplink data transmission on the uplink shared channel, wherein the first type of UE of the set of UE types is configured to perform a first UCI multiplexing procedure when the uplink shared channel at least partially overlaps with the uplink control channel, and wherein a second type of UE of the set of UEs is configured to perform a different UCI multiplexing procedure when the uplink shared channel at least partially overlaps with the uplink control channel; and
transmit the uplink control information and the uplink data transmission multiplexed on the uplink shared channel.

23. The apparatus of claim 22, wherein the uplink shared channel and the uplink control channel are during a first transmission time interval, wherein the one or more processors are further configured to cause the UE to:
  determine, during a second transmission time interval, that a first uplink channel at least partially overlaps with a second uplink channel; and
  determine to drop one of the first uplink channel or the second uplink channel based at least in part on identifying that a first symbol period of the first uplink channel is misaligned with a first symbol period of the second uplink channel.

24. The apparatus of claim 23, wherein the one or more processors are further configured to cause the UE to:
  determine that the first uplink channel has a first priority level and that the second uplink channel has a second priority level that is lower priority than the first priority level;
  transmit an uplink message on the first uplink channel based at least in part on the second priority level being the lower priority than the first priority level; and
  drop the second uplink channel based at least in part on the second priority level being the lower priority than the first priority level.

25. The apparatus of claim 23, wherein the first uplink channel comprises a second uplink shared channel and the second uplink channel comprises a second uplink control channel.

26. The apparatus of claim 23, wherein the one or more processors are further configured to cause the UE to:
  receive a downlink data transmission on a downlink shared channel, wherein the uplink control information comprises acknowledgement feedback corresponding to the data transmission on the downlink shared channel;
  determine that a first time between receiving the downlink data transmission and transmitting the acknowledgement feedback and the uplink data transmission satisfies a first threshold time;
  determine that a second time between receiving the downlink control message and transmitting the acknowledgement feedback and the uplink data transmission satisfies a second threshold time; and
  multiplex the acknowledgement feedback and the uplink data transmission based at least in part on the first time satisfying the first threshold time and the second time satisfying the second threshold time.

27. An apparatus for wireless communications at a user equipment (UE), comprising:
  memory; and
  one or more processors coupled with the memory and configured to cause the UE to:
    receive a downlink control message indicating a grant of resources for an uplink data transmission on an uplink shared channel of a second component carrier, the uplink shared channel at least partially overlapping with an uplink control channel for uplink control information on a first component carrier;
    identify that the UE is a first type of a set of UE types, wherein a second type of the set of UE types is associated with multiplexing uplink control information and uplink data transmissions across multiple component carriers; and
    transmit, based at least in part on the UE being the first type, the uplink control information on the uplink control channel on the first component carrier and the uplink data transmission on the uplink shared channel on the second component carrier.

28. The apparatus of claim 27, wherein the one or more processors are further configured to cause the UE to:
  refrain, based at least in part on the UE being the first type, from multiplexing the uplink control information and the uplink data transmission on the first component carrier;
  refrain, based at least in part on the UE being the first type, from multiplexing the uplink control information and the uplink data transmission on the second component carrier; or
  both.

29. The apparatus of claim 27, wherein the first type of UE of the set of UE types is configured to perform a first UCI multiplexing procedure comprising transmitting the uplink control channel on the first component carrier and the uplink data transmission on the uplink shared channel on the second component carrier, and wherein the second type of UE of the set of UEs configured to perform a different UCI multiplexing procedure.

30. The apparatus of claim 27, wherein the one or more processors are further configured to cause the UE to:
  receive a second downlink control message indicating a grant of resources for a second uplink data transmission on a second uplink shared channel of the first component carrier, the second uplink data transmission at least partially overlapping with a second uplink control channel for second uplink control information; and
  transmit, based at least in part on the UE being the first type, both the second uplink control information and the second uplink data transmission over the second uplink shared channel on the first component carrier.

* * * * *